United States Patent
Wickes et al.

(10) Patent No.: US 11,374,824 B2
(45) Date of Patent: Jun. 28, 2022

(54) TIME-BASED VISUALIZATION FOR NETWORK VIRTUALIZATION PLATFORM

(71) Applicant: AT&T Intellectual Property I, L.P., Atlanta, GA (US)

(72) Inventors: Roger Drew Wickes, Gainesville, GA (US); John Oetting, Zionsville, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/105,844

(22) Filed: Nov. 27, 2020

(65) Prior Publication Data

US 2022/0173979 A1   Jun. 2, 2022

(51) Int. Cl.
  *H04L 41/147*  (2022.01)
  *H04L 41/22*   (2022.01)
  *H04L 41/12*   (2022.01)

(52) U.S. Cl.
  CPC ............ *H04L 41/147* (2013.01); *H04L 41/12* (2013.01); *H04L 41/22* (2013.01)

(58) Field of Classification Search
  CPC ........ H04L 41/147; H04L 41/22; H04L 41/12
  See application file for complete search history.

(56) References Cited

U.S. PATENT DOCUMENTS

| | | |
|---|---|---|
| 7,024,419 B1 | 4/2006 | Klenk et al. |
| 7,224,362 B2 | 5/2007 | Kincaid et al. |
| 7,454,439 B1 | 11/2008 | Gansner et al. |
| 7,523,187 B1 | 4/2009 | Lavallee |
| 8,019,865 B2 | 9/2011 | Chang et al. |
| 8,782,265 B1 | 7/2014 | Bokotey |
| 8,935,396 B2 | 1/2015 | Bokotey |
| 8,984,121 B1 | 3/2015 | Labat |
| 9,268,460 B1 | 2/2016 | Xu |
| 9,418,455 B1 | 8/2016 | Wong |

(Continued)

OTHER PUBLICATIONS

Shneiderman, Ben, "Network Visualization by Semantic Substrates," IEEE Transactions on Visualization and Computer Graphics, Sep./Oct. 2006, pp. 733-740, vol. 12, No. 5.

(Continued)

*Primary Examiner* — Andrew C Georgandellis
*Assistant Examiner* — Joseph M Cousins
(74) *Attorney, Agent, or Firm* — Hartman & Citrin LLC

(57) ABSTRACT

Concepts and technologies disclosed herein are directed to time-based visualizations for network virtualization platforms ("NVPs"). A computer system can obtain data associated with an NVP. The data can include present state data associated with a present state of the NVP, past state data associated with a past state of the NVP, and future state data associated with a predicted future state of the NVP. The computer system can generate a visualization of the data associated with the NVP. The computer system can present a temporal management function that includes a plurality of selections representative of the present state, the past state, and the predicted future state. The computer system can receive a selection, from the plurality of selections, of the present state, the past state, or the predicted future state. The computer system can manipulate the visualization in accordance with the selection and output the visualization.

15 Claims, 18 Drawing Sheets

(56) References Cited

U.S. PATENT DOCUMENTS

| | | |
|---|---|---|
| 9,647,909 B2 | 5/2017 | Kuan |
| 10,491,705 B2 | 11/2019 | Oetting et al. |
| 10,536,355 B1 | 1/2020 | Cao |
| 10,708,183 B2 | 7/2020 | Jeuk |
| 10,862,749 B1 | 12/2020 | Kiyak |
| 2001/0042118 A1 | 11/2001 | Miyake |
| 2005/0010386 A1 | 1/2005 | Tharp |
| 2008/0077868 A1 | 3/2008 | Bartucca |
| 2008/0123586 A1 | 5/2008 | Manser |
| 2008/0281912 A1 | 11/2008 | Dillenberger |
| 2010/0110932 A1 | 5/2010 | Doran |
| 2013/0050246 A1 | 2/2013 | Barry |
| 2013/0311832 A1* | 11/2013 | Lad .................. H04L 43/0852 714/37 |
| 2014/0013432 A1 | 1/2014 | Yi |
| 2014/0181718 A1 | 6/2014 | Gao |
| 2014/0201642 A1 | 7/2014 | Vicat-Blanc |
| 2015/0207755 A1 | 7/2015 | Tsai |
| 2015/0277982 A1 | 10/2015 | Iwata |
| 2016/0119204 A1 | 4/2016 | Murasato |
| 2016/0212172 A1 | 7/2016 | Senanayake |
| 2016/0219078 A1 | 7/2016 | Porras |
| 2016/0292022 A1 | 10/2016 | Fan |
| 2017/0034274 A1 | 2/2017 | Hanney |
| 2017/0070594 A1* | 3/2017 | Getting ............... G06F 3/04815 |
| 2017/0085446 A1* | 3/2017 | Zhong .................. H04L 41/22 |
| 2017/0155557 A1* | 6/2017 | Desai ..................... H04L 43/08 |
| 2018/0349002 A1* | 12/2018 | Kindelsberger ...... G06F 3/0484 |
| 2019/0384865 A1* | 12/2019 | Jaiswal .................. H04L 67/10 |
| 2020/0175951 A1 | 6/2020 | Desai |
| 2020/0314022 A1 | 10/2020 | Vasseur |
| 2021/0279632 A1* | 9/2021 | Di Pietro .............. H04L 41/142 |
| 2021/0344561 A1 | 11/2021 | Seewald |
| 2022/0051057 A1 | 2/2022 | Kounev |

OTHER PUBLICATIONS

Estrin et al., "Network Visualization with Nam, the VINT Network Animator," Computer, Nov. 2000, pp. 63-68, IEEE.

Chopade et al., "Visualization Techniques for Large-Scale Big Data Networks: Smart Power Grid Survivability in a Complex Operating Environment," ASE BigData/SocialInformatics/PASSAT/BioMedCom 2014 Conference, Dec. 14-16, 2014, ASE.

Shi et al., "1.5D Egocentric Dynamic Network Visualization," IEEE Transactions on Visualization and Computer Graphics, May 2015, pp. 624-637, vol. 21, No. 5.

U.S. Office Action dated Jun. 29, 2017 in U.S. Appl. No. 14/847,573.

U.S. Office Action dated Jan. 8, 2018 in U.S. Appl. No. 14/847,573.

U.S. Office Action dated Dec. 26, 2018 in U.S. Appl. No. 14/847,573.

U.S. Notice of Allowance dated Jul. 11, 2019 in U.S. Appl. No. 14/847,573.

U.S. Office Action dated Mar. 15, 2022 in U.S. Appl. No. 17/105,860.

* cited by examiner

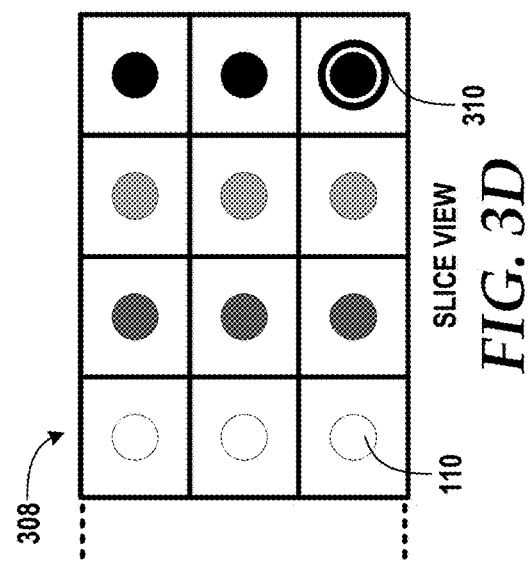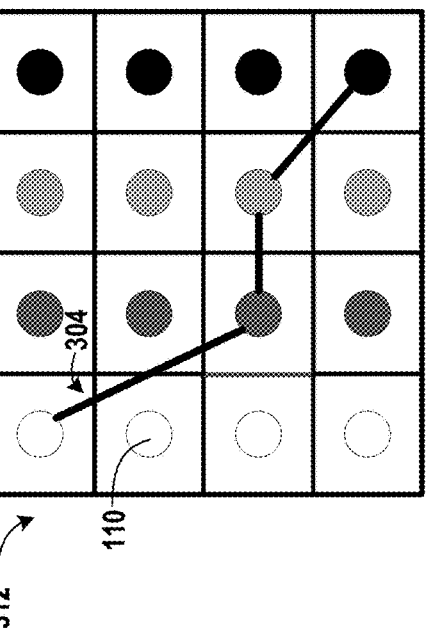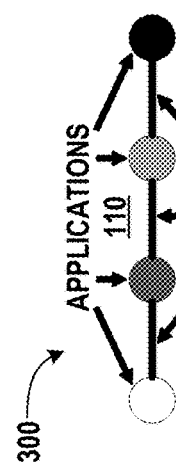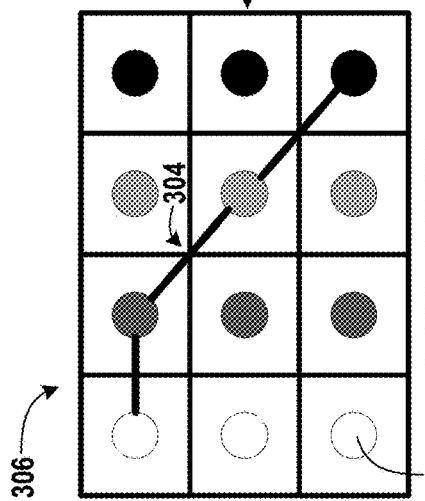

TIME-BASED VISUALIZATION FOR NETWORK VIRTUALIZATION PLATFORM

BACKGROUND

Software-defined networking ("SDN") is an architectural framework for creating intelligent networks that are programmable, application aware, and more open. SDN provides an agile and cost-effective communications platform for handling the dramatic increase in data traffic on carrier networks by providing a high degree of scalability, security, and flexibility. SDN provides several benefits. SDN can allow for the creation of multiple virtual network control planes on common hardware. SDN can help extend service virtualization and software control into many existing network elements. SDN enables applications to request and manipulate services provided by the network and to allow the network to expose network states back to the applications. SDN exposes network capabilities through application programming interfaces ("APIs"), making the control of network equipment remotely accessible and modifiable via third-party software clients using open protocols such as OpenFlow, available from Open Network Forum ("ONF").

User-defined, on-demand cloud services and user digital experience expectations are driving planning and deployment of network functional virtualization and service-centric SDN among global telecommunications service providers. Network Virtualization Platforms ("NVPs") are deployed in information technology ("IT") data centers, network central offices, and other network points of presence ("POPs") to accelerate deployment of on-demand user service and virtualized network functions. An NVP is a shared virtualized infrastructure that supports multiple services and network applications (including real-time and non-real-time applications).

Combining SDN and NVP functionality provides a highly complex and dynamic set of relationships between virtual, logical, and physical resources. Autonomous controls and real-time service path steering, workload, creation, distribution, and destruction are inherent NVP capabilities, but currently no unified and holistic method exists for human operators to understand, model, and design service paths and to understand and control the operations of the environment. Currently available solutions are dominated by tools and techniques developed to support traditional information technology and network domains, which, in comparison, are relatively simple and static, and are therefore ill-suited to SDN/NVP and similar environments. The new dimensions of SDN/NVP require a new dimension of human insight and control.

SUMMARY

Concepts and technologies disclosed herein are directed to time-based visualizations for network virtualization platforms ("NVPs"). According to one aspect disclosed herein, a computer system can obtain data associated with an NVP. The data can include present state data associated with a present state of the NVP, past state data associated with a past state of the NVP, and future state data associated with a predicted future state of the NVP. The computer system can generate a visualization of the data associated with the NVP. The computer system can present a temporal management function that includes a plurality of selections representative of the present state, the past state, and the predicted future state. The computer system can receive, via the temporal management function, a selection, from the plurality of selections, of the present state, the past state, or the predicted future state. The computer system can manipulate the visualization in accordance with the selection and output the visualization.

In some embodiments, the visualization includes a three-dimensional visualization. The three-dimensional visualization can include a central cube visualization. The central cube visualization can include a plurality of smaller cube visualizations. Each of the plurality of smaller cube visualizations can include a node representative of an application. The application can be executable by at least a portion of a plurality of resources of the NVP. The central cube visualization, in some embodiments, includes a plurality of networking links between at least a portion of the plurality of applications of the plurality of smaller cube virtualizations.

In some embodiments, the data further includes data associated with a topology of the plurality of resources of the NVP. In these embodiments, the computer system can receive a request to instantiate a service instance of a service provided by the NVP. In response to the request, the computer system can generate a logical topology view of the central cube visualization. The computer system can output the logical topology view of the central cube visualization. The logical topology view can include at least a portion of the topology of the plurality of resources of the NVP. The logical topology view can represent a service path. The service path can include and identify a set of the plurality of resources utilized by the service.

In some embodiments, the temporal management function can include a timeline. Each of the plurality of selections can include a time interval. The time intervals can be in increments of seconds, minutes, days, hours, weeks, months, years, or any division or multiple thereof. In some embodiments, the computer system can manipulate the visualization in accordance with selection by transitioning, at least in part, between the present state, the past state, and the future state. This may appear as if the visualization is morphing from one state to another. For example, a user may pause, fast forward (towards the future state), or rewind (towards the past state) by selecting different time intervals.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3H are diagrams illustrating aspects of various views of an example visualization, according to an illustrative embodiment.

DETAILED DESCRIPTION

Combining SDN and NVP functionality provides a highly complex and dynamic set of relationships between virtual, logical, and physical resources. Autonomous controls and real-time service path steering, workload, creation, distribution, and destruction are inherent NVP capabilities but currently no unified and holistic method exists for human operators to understand, model, and design service paths and to understand and control the operations of the environment. Currently available solutions are dominated by tools and techniques developed to support traditional information technology and network domains, which, in comparison, are relatively simple and static, and are therefore ill-suited to SDN/NVP and similar environments. The new dimensions of SDN/NVP and similar environments require a new dimension of human insight and control.

The concepts and technologies disclosed herein facilitate relating physical and logical aspects of SDN/NVP and applications for use in service design, instantiation, and operations by both internal users and external customers. The concepts and technologies described herein, in some embodiments, provide a three-dimensional cube metaphor that allows visualization, navigation, temporal views, and manipulation of service logic specified by the alignment of service paths onto a service graph. Moreover, the application of virtual reality and augmented reality technologies provides an intuitive, effective, and highly-differentiated experience for network management.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
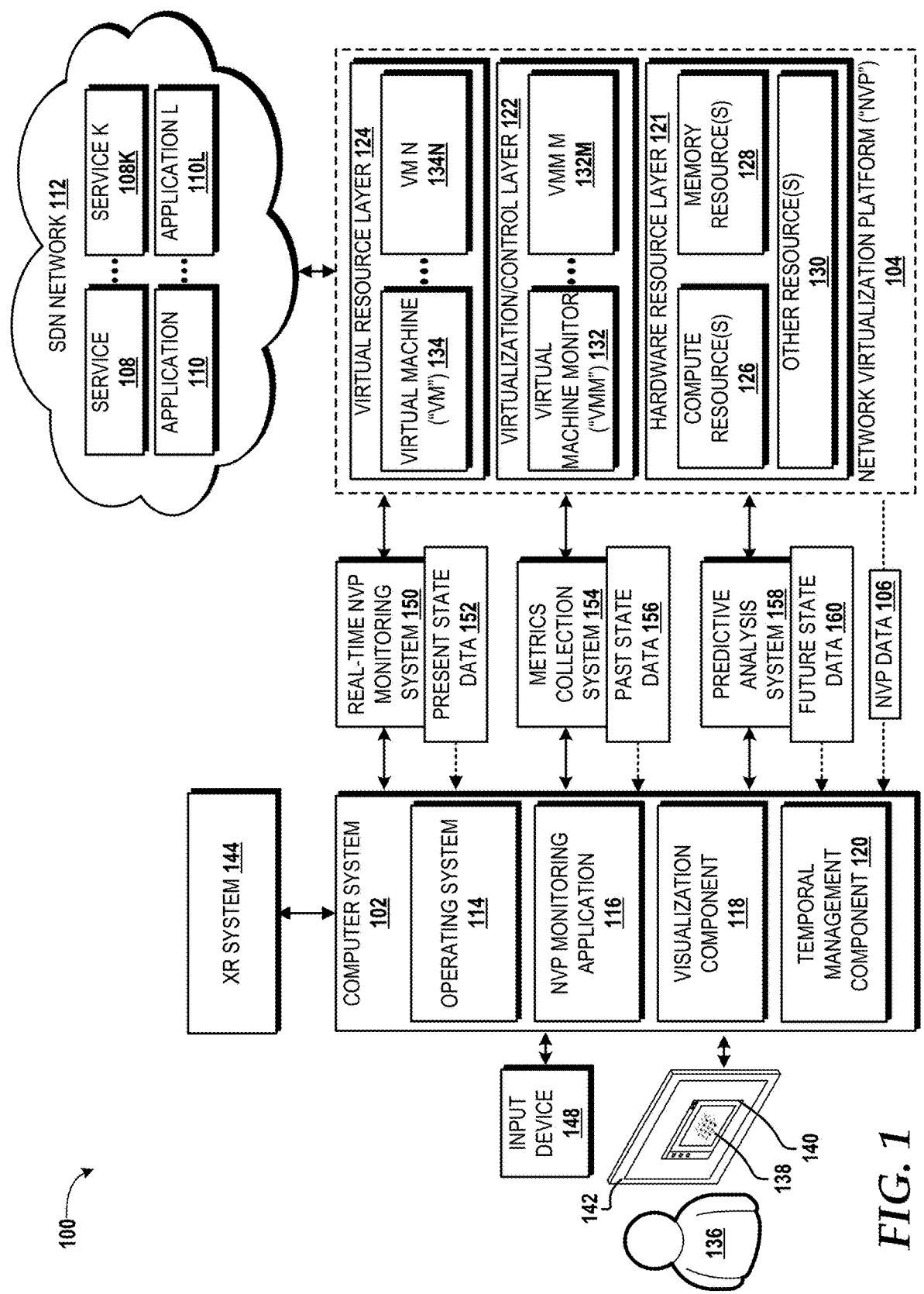
FIG. 1 is a block diagram illustrating aspects of an illustrative operating environment for implementing the various concepts and technologies disclosed herein.

While connections are shown between some of the components illustrated in FIG. 1, it should be understood that some, none, or all of the components illustrated in FIG. 1 can be configured to interact with one other to carry out various functions described herein. Thus, it should be understood that FIG. 1 and the following description are intended to provide a general understanding of a suitable environment in which various aspects of embodiments can be implemented, and should not be construed as being limiting in any way.

Referring now to FIG. 1, aspects of an operating environment 100 for implementing various embodiments of the concepts and technologies disclosed herein will be described. The operating environment 100 shown in FIG. 1 includes a computer system 102 operating on or in communication with an NVP 104 to provide functionality in accordance with the concepts and technologies disclosed herein to visualize NVP data 106 associated with and received from the NVP 104, including, for example, data associated with one or more services 108-108K provided, at least in part, by one or more applications 110-110L operating within an SDN network 112 created and managed, at least in part, by the NVP 104. It should be understood that the concepts and technologies disclosed herein, while described in context of the services 108 provided, at least in part, by the applications 110 operating within the SDN network 112 created and managed, at least in part, by the NVP 104, are applicable to any type of service. As such, the specific references to visualizing the NVP data 106 should not be construed as being limiting in any way.

According to various implementations of the concepts and technologies disclosed herein, the computer system 102 can include a user computing device, such as a tablet computing device, a personal computer ("PC"), a desktop computer, a laptop computer, a notebook computer, a cellular phone or smartphone, other mobile computing devices, a personal digital assistant ("PDA"), or the like. Example architectures of the computer system 102 are illustrated and described herein below with reference to FIGS. 13 and 15. The functionality of the computer system 102 can be provided, at least in part, by a cloud-based computing platform that can be provided by one or more application servers, web servers, data storage systems, network appliances, dedicated hardware devices, and/or other server computers or computing devices, which might, in some embodiments, leverage compute, memory, and/or other resources of the NVP 104 to perform operations described herein. In light of the above alternative embodiments of the computer system 102, it should be understood that this example is illustrative and should not be construed as being limiting in any way.

The computer system 102 can be configured to execute an operating system 114 and one or more application programs such as, for example, an NVP monitoring application 116, a visualization component 118, a temporal management component 120, and/or other application programs. The operating system 114 is a computer program for controlling the operation of the computer system 102. The application programs are executable programs configured to execute on top of the operating system 114. In some embodiments, at least a portion of the NVP monitoring application 116 functionality, the visualization component 118 functionality, and/or the temporal management component 120 functionality is included in the operating system 114. In some other embodiments, at least a portion of the NVP monitoring application 116 functionality, the visualization component 118 functionality, and/or the temporal management component 120 functionality is included in the NVP 104, wherein the computer system 102 accesses the functionality via a communications interface.

In some embodiments, the visualization component 118 can be implemented as part of the NVP monitoring application 116. In some embodiments, the visualization component 118 can be implemented as a component separate from the NVP monitoring application 116. In some embodiments, the visualization component 118 can be provided as a stand-alone application. Similarly, in some embodiments, the temporal management component 120 can be implemented as part of the NVP monitoring application 116 or a component separate from the NVP monitoring application 116. In some embodiments, the temporal management component 120 can be provided as a stand-alone application. Thus, while the NVP monitoring application 116, the visualization component 118, and the temporal management component 120 are illustrated as components of the computer system 102, it should be understood that each of these components, or combinations thereof, may be embodied as or in stand-alone devices or components thereof operating on or in communication the computer system 102. Thus, the illustrated embodiment is illustrative and should not be construed as being limiting in any way.

In some embodiments, the visualization component 118 and/or the temporal management component 120 can be implemented as a plugin or add-in for the NVP monitoring application 116. In some other embodiments, the visualization component 118 and/or the temporal management component 120 can include a service and/or set of application programming interfaces ("APIs") that can provide the functionality described herein. Thus, it should be appreciated that the visualization component 118 and/or the temporal management component 120 can be implemented as hardware, software, or a combination thereof.

The NVP 104 is a shared infrastructure that can support multiple services, such as the services 108, and multiple network applications, such as the applications 110 (including real-time and non-real-time applications). The NVP 104 can utilize cloud sharing constructs to virtualize network functions by decoupling hardware and software, making networks, such as the SDN network 112, more flexible and physically uniform by minimizing dependence upon hardware constraints. The NVP 104 uses SDN to provide programmability and abstraction of underlying hardware complexity and to separate management and control planes from the data plane.

The applications 110 can include, but are not limited to, one or more applications that provide or utilize, at least in part, one or more of the services 108, such as, for example, domain name service ("DNS"), network address translation ("NAT"), remote add/drop multiplexing, remote authentication dial-in user service ("RADIUS"), firewall, encryption/decryption, network content packet routing, dynamic host configuration protocol ("DHCP"), lightweight directory access protocol ("LDAP"), content routing in either or both of the control and data planes, and route reflecting in either or both the control and data planes. The services 108 also can include one or more real-time services such as, but are not limited to, voice over internet protocol ("VoIP") service, streaming video service, videoconferencing service, online gaming service, chatting service, instant messaging ("IM") service, and the like in the service plane. Both synchronous and asynchronous (e.g., transactional) services are contemplated.

The illustrated NVP 104 includes a hardware resource layer 121, a virtualization/control layer 122, and a virtual resource layer 124 that work together to perform operations as will be described in detail herein. The hardware resource layer 121 provides hardware resources, which, in the illustrated embodiment, include one or more compute resources 126, one or more memory resources 128, and one or more other resources 130.

The compute resource(s) 126 can include one or more hardware components that perform computations to process data, and/or to execute computer-executable instructions of one or more application programs, operating systems, and/or other software, including the applications 110 to provide, at least in part, the services 108. The compute resources 126 can include one or more central processing units ("CPUs") configured with one or more processing cores. The compute resources 126 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 126 can include one or more discrete GPUs. In some other embodiments, the compute resources 126 can include CPU and GPU components that are configured in accordance with a co-processing CPU/GPU computing model, wherein the sequential part of an application executes on the CPU and the computationally-intensive part is accelerated by the GPU. The compute resources 126 can include one or more system-on-chip ("SoC") components along with one or more other components, including, for example, one or more of the memory resources 128, and/or one or more of the other resources 130. In some embodiments, the compute resources 126 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 126 can be or can include one or more hardware components architected in accordance with an ARM architecture, available for license from ARM HOLDINGS of Cambridge, United Kingdom. Alternatively, the compute resources 126 can be or can include one or more hardware components architected in accordance with an x86 architecture, such an architecture available from INTEL CORPORATION of Mountain View, Calif., and others. Those skilled in the art will appreciate the implementation of the compute resources 126 can utilize various computation architectures or combinations thereof, and as such, the compute resources 126 should not be construed as being limited to any particular computation architecture or combination of computation architectures, including those explicitly disclosed herein.

The memory resource(s) 128 can include one or more hardware components that perform storage operations, including temporary or permanent storage operations. In some embodiments, the memory resource(s) 128 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 126.

The other resource(s) 130 can include any other hardware resources that can be utilized by the compute resources(s) 126 and/or the memory resource(s) 128 to perform operations described herein. The other resource(s) 130 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 121 can be virtualized by one or more virtual machine monitors ("VMMs") 132-132M (also known as "hypervisors;" hereinafter "VMMs 132") operating within the virtualization/control layer 122 to manage one or more virtual resources that reside in the virtual resource layer 124. The VMMs 132 can be or can include software, firmware, and/or hardware that alone or in combination with other software, firmware, and/or hardware, manages one or more virtual resources operating within the virtual resource layer 124.

The virtual resources operating within the virtual resource layer 124 can include abstractions of at least a portion of the compute resources 126, the memory resources 128, the other resources 130, or any combination thereof. These abstractions are referred to herein as virtual machines ("VMs"). It should be understood, however, that other container technologies can be used and are contemplated. In the illustrated embodiment, the virtual resource layer 124 includes VMs 134-134N (hereinafter "VMs 134"). The VMs 134 can execute the applications 110 to provide, at least in part, the services 108. Each of the VMs 134 can execute one or more of the applications 110 or one or more portions thereof. For example, one or more of the VMs 134 can execute one or more of the applications 110 to utilize or provide, at least in part, the services 108 such as, but not limited to, DNS, RADIUS, DHCP, LDAP, content routing in either or both of the control and data planes, and route reflecting in either or both the control and data planes. The applications 110 also can include one or more applications that provide, at least in part, one or more real-time services such as, but are not limited to, VoIP, streaming video service, videoconferencing service, online gaming service, chatting service, IM service, and the like in the service plane.

The NVP data 106 can include any data associated with the NVP 104. For example, the NVP data 106 can be or can include data associated with the operational state(s) and configuration(s) of one or more components of the NVP 104, such as the operational states and configurations of the virtual resources operating within the virtual resource layer 124. The NVP data 106 also can include data associated with application resources, such as one or more of the applications 110-110L.

The NVP 104 can provide the NVP data 106 to the computer system 102 periodically, continuously, and/or upon request. The NVP monitoring application 116 can, in some embodiments, include functionality to enable a user 136 to schedule periodic retrieval of the NVP data 106 from the NVP 104 or to request the NVP data 106 on-demand. The NVP 104, in some embodiments, can be configured to report the NVP data 106 to the computer system 102 periodically or in response to an event, such as a change of an operational state and/or of a configuration of one or more of the virtual resources operating within the virtual resource layer 124 and/or one or more application resources instantiated in the SDN network 112.

The NVP monitoring application 116 can receive the NVP data 106 and can provide at least a portion of the NVP data 106 to the visualization component 118. The visualization component 118 alternatively can request the NVP data 106 from the NVP monitoring application 116. In either case, the visualization component 118 can obtain the NVP data 106, generate, based upon the NVP data 106, a visualization 138 of the NVP data 106, and output the visualization 138 via a user interface ("UI") 140 of the visualization component 118 via a display 142, an extended reality ("XR") system 144, or a combination thereof. The user 136 can interact with the UI 140 of the visualization component 118 to view and interact with the visualization 138. In doing so, the user 136 can exert influence upon the automation and control of the NVP 104 or at least a portion thereof.

The visualization 138 can be generated by any software framework designed for the creation and development of graphics. Some example software frameworks include, but are not limited to, AUTOCAD (available from AUTODESK), BLENDER (available from the open source BLENDER FOUNDATION), UNREAL ENGINE (available from EPIC GAMES), UNITY (available from UNITY TECHNOLOGIES), CRYENGINE (available from CRYTEK), HAVOK VISION ENGINE (available from HAVOK), other proprietary software frameworks, open source software frameworks, combinations thereof, and the like. Those skilled in the art will appreciate the wide range of graphical fidelity, visual styles, and other attributes the visualization 138 might have, including color, shape, texture, space, form, dynamics (e.g., bouncing, flashing, and the like), and other design and/or interaction elements. As such, further details in this regard are not provided herein since these are mere design decisions.

The display 142 is an output device configured to present information in a visual form. In some embodiments, the display 142 is two-dimensional or three-dimensional rendering device using a liquid crystal display ("LCD") utilizing any active or passive matrix technology and can utilize any backlighting technology. In some embodiments, the display 142 is an organic light emitting diode ("OLED") display. The display 142 can be embodied with other display technologies. In some embodiments, the display 142 is part of the XR system 144. For example, the XR system 144 may be a virtual reality ("VR") headset such as one of the OCULUS family of VR headsets (available from FACEBOOK). As such, the examples provided above should not be considered limiting in any way.

The XR system 144 can provide an augmented reality through which at least a portion of a physical, real-world environment is augmented to include the visualization 138. The visualization 138 can be presented via the XR system 144 over and/or spatially integrated with real-world objects of the physical, real-world environment. In these embodiments, the XR system 144 can utilize a camera component (not shown) to provide a live view of the physical, real-world environment to be augmented with the visualization 138. In other embodiments, the XR system 144 can provide a non-live view of a physical, real-world environment. The non-live view can present a physical, real-world environment as a static image representative of a past reality that can be augmented with the visualization 138.

The XR system 144 can be in communication with the computer system 102 via a wireless or wired connection through which data, such as the NVP data 106 and other data associated with the visualization 138, can be shared. The XR system 144 can function as a stand-alone system that utilizes on-board computing components to perform operations to present and facilitate manipulation of an augmented reality augmented with the visualization 138, or alternatively, can leverage the computing resources of the computer system 102, or even at least a portion of the hardware resources in the hardware resource layer 121 of the NVP 104 to perform such operations.

The XR system 144, in some embodiments, is or includes a camera (e.g., a still camera and/or video camera), a sensor (e.g., an accelerometer, a global positioning system sensor, a solid state compass, or the like), a display (e.g., an integrated display, a head-mounted display, an eyeglasses display, a head-up display, an external monitor, a projection system, or a holographic display), an input device, the like, or any combination thereof. In some embodiments, the XR system 144 is or includes a wearable computing device that includes an integrated display through which to present the visualization 138 via an augmented reality. The XR system 144, in these embodiments, can be GOOGLE GLASS, available from GOOGLE INC., or MICROSOFT HOLOLENS, available from MICROSOFT CORP. Other devices, such as mobile telephones, smartphones, tablet computers, slate computers, smart watches, laptop computers, notebook computers, ultrabook computers, netbook computers, computers of other form factors, computing devices of other form factors, other computing systems, other computing devices, and/or the like, can be configured to execute one or more XR applications to function as the XR system 144 described herein.

The XR system 144 can provide a computer-generated environment (also referred to herein as a "virtual reality" or "VR" environment) that the user 136 can explore. The virtual environment can be or can include the visualization 138. A VR environment can include a computer-generated representation or at least an approximation of at least a portion of a physical, real-world environment with the visualization 138 integrated within. The VR environment can be at least partially different from the physical, real-world environment of which the VR environment is representative with the visualization 138 integrated within. The VR environment can include virtual objects not found in the corresponding physical, real-world environment. Lighting effects such light bloom and other effects such as depth-of-field can be applied to the VR environment to create atmosphere. Moreover, natural phenomena such as gravity and momentum can be simulated in the virtual environment. These natural phenomena can be simulated, for example, when the user 136 interacts with the visualization 138.

The XR system 144, in some embodiments, is or includes a display (e.g., an integrated display, a head-mounted display, an eyeglasses display, a head-up display, an external monitor, or a projection system), an input device, a combination thereof, or the like. In some embodiments, the XR system 144 is OCULUS RIFT (available from FACEBOOK), GOOGLE CARDBOARD (available from GOOGLE), HTC VIVE (available from HTC), PLAYSTATION VR (available from SONY), or the like.

The visualization 138 can be presented on the display 142, via the XR system 144 and can be interacted with by the user 136 through one or more input devices 148. Although shown as being external to the computer system 102, the display 142, the XR system 144, and the input device(s) 148 can be implemented as part of the computer system 102, the display 142, and/or the XR system 144. The input device(s) 148 can be or can include one or more touchscreens, one or more multi-touch touchscreens, one or more keyboards, one or more computer mice, one or more game controllers, one or more joysticks, one or more touchpads, one or more gesture devices (e.g., MICROSOFT KINECT or MICROSOFT HOLOLENS, both available from MICROSOFT CORPORATION), combinations thereof, or the like.

The visualization 138, in some embodiments, includes a three-dimensional visualization. The visualization 138 may change over time. The three-dimensional visualization can include a central cube visualization. The central cube visualization can include a three-dimensional assemblage of stacks of smaller cubes, each representing one or more application resources such as one or more of the applications 110. At the core of each smaller cube in the visualization 138 can be a node representing the application resource(s). Networking among the application resources can be represented as links between the nodes of the cubes. When referencing the visualization 138 in the description below, a central cube visualization as described above will provide the context. It should be understood, however, that other shapes can be used by the visualization component 118 to convey, to the user 136, similar information. Some illustrative examples of the visualization 138 are illustrated with reference to FIGS. 3A-3H, which are described in greater detail below.

The visualization 138 can provide a service graph. A "service graph," as used herein, is a collection of available resources (such as application resources embodied as the applications 110) along with sequencing and relationships available to be used to process data plane service requests to instantiate a service instance of one or more of the services 108. A service graph describes the actual topology of the resources instantiated and operationalized by the NVP 104 within the SDN network 112. A service graph can be viewable as a full view of the visualization 138. An illustrative example of a service graph is shown in FIG. 3B.

A "service path," as used herein, is a collection of specific resources from the service graph along with sequencing and relationships used to process a specific data plane service request. A service path describes a logical topology of the resources included in a particular instance of a service, such as one of the services 108. The illustrative service paths provided herein follow a flow convention of left-to-right, although right-to-left and/or other flows are contemplated. A logical view of a service path can be provided by a face plane view of the visualization 138. An illustrative example of a logical view of a service path as a face plane view of a central cube visualization is shown in FIG. 3C. The visualization 138 can provide a plurality of layers of the face plane view. Each of the layers can represent a physical technical plant ("TeP") location. Physical TePs can be or can include one or more telco central offices ("COs"), one or more data centers, one or more outside plant environments (e.g., huts, bunkers, poles, and the like), customer premises locations, and the like. The specific resources in a specific TeP location that are processing a particular data plane service request can be identified by sliding out the corresponding layer for examination by the user 136, or by navigating into the visualization 138.

A network (or administrative domain) wide view across all TePs can be provided by a top plane view of the visualization 138. A top plane view identifies the collection of all potential physical resources, such as provided in the hardware resource layer 121 of the NVP 104, available to process a particular data plane service request, as well as the specific resources that are processing a particular data plane service request. This view is perhaps most valuable for steering service requests, which would be enabled by disconnecting a network link from an application resource in one TeP and reconnecting it to the same type of resource in another TeP. An illustrative example of this view is shown in FIG. 3E. Service logic can be defined by aligning a service path onto a service graph. "Service Logic," as used herein, is what aligns a service path onto a service graph. Data plane traffic steering/engineering is one aspect of service logic and can be accomplished by adding and connecting application resources across and within TePs. Service logic can be constrained by affinity/anti-affinity rules, quality of service ("QoS") parameters (e.g., latency), regulatory, business needs, and the like. Service logic controls embedded within the visualization 138 can be manipulated by operators and/or customers, such as the user 136, to influence the data plane traffic of the underlying NVP, such as the NVP 104.

The user 136 can interact with the visualization 138 through the UI 140 using various actions. The actions can include user input received by the computer system 102 via the display 142, the XR system 144, the input device(s) 148, or some combination thereof from the user 136. The actions can include movement actions such as, but not limited to, pan up, pan down, pan left, pan right, rotate clockwise, rotate counter-clockwise, tilt down, tilt up, zoom in, zoom out, field-of-view increase, field-of-view decrease, and the like. The movement actions can be used to navigate the visualization 138. The actions can include time manipulations controlled via the temporal management component 120. The time manipulations can allow the user 136 to navigate the visualization 138 through time to explore the NVP 104 at different times such as in the past, present, and future. Other actions to add, delete, and/or modify at least a portion of the visualization 138 also are contemplated.

In some embodiments, the user 136 might perform gestures as user input to perform one or more actions. Gestures might be performed using hand-held controllers, optically recognized, or by touching a single or multi-touch touchscreen. Gestures might be open-space gestures through which the user 136 utilizes at least a portion of his or her body as user input to perform one or more actions in space. For example, the input device 148 embodied as KINECT or HOLOLENS can enable the user 136 to perform such gestures to interact with the visualization 138. Several gestures will now be described. It should be understood that these gestures are illustrative and are not intended to limit the scope of the appended claims. Moreover, the described gestures, additional gestures, and/or alternative gestures may be implemented in software for use by the computer system 102 via the display 142, the XR system 144, the input device(s) 148, or some combination thereof. As such, a developer may create gestures that are specific to a particular application program, such as the visualization component 118.

In some embodiments, the input device 148 embodied as a touchscreen can support a tap gesture in which the user 136 taps the touchscreen once on an item presented on the display 142 to select at least a portion of the visualization 138. In some embodiments, the touchscreen supports a double tap gesture in which the user 136 taps the touchscreen twice on an item presented on the display 142 to perform an action such as, but not limited to, zooming into or zooming out of the visualization 138 in stages. In some embodiments, the touchscreen supports a tap and hold gesture in which the user 136 taps the touchscreen and maintains contact for at least a pre-defined time to perform an action such as opening a context-specific menu to make available additional options for the user 136 to interact with the visualization 138.

In some embodiments, the input device 148 embodied as a touchscreen can support a pan gesture in which the user 136 places a finger on the touchscreen and maintains contact with the touchscreen while moving the finger on the touchscreen. The pan gesture may be used for various reasons including, but not limited to, moving through or around the visualization 138 at a controlled rate. Multiple finger pan gestures are also contemplated. In some embodiments, the touchscreen supports a flick gesture in which the user 136 swipes a finger in the direction the user 136 wants the screen to move. The flick gesture may be used for various reasons including, but not limited to, scrolling horizontally or vertically through the visualization 138. In some embodiments, the touchscreen supports a pinch and stretch gesture in which the user 136 makes a pinching motion with two fingers (e.g., thumb and forefinger) on the touchscreen or moves the two fingers apart. The pinch and stretch gesture may be used for various reasons including, but not limited to, zooming gradually in or out of the visualization 138.

Although the above gestures have been described with reference to the use of one or more fingers for performing the gestures on the input device 148 embodied as a touchscreen, other appendages such as toes or objects such as styluses may be used to interact with the visualization 138 via the touchscreen. As such, the above gestures should be understood as being illustrative and should not be construed as being limiting in any way. Moreover, the above gestures might find counterparts in other technologies disclosed herein, including those useable by the XR system 144.

The computer system 102 and the NVP 104 can be in communication with a real-time NVP monitoring system 150 that collects present state data 152. The present state data 152 is a subset of the NVP data 106 that is collected in real-time. Although the real-time NVP monitoring system 150 is illustrated as a system, the functionality of the real-time NVP monitoring system 150 can be implemented as a standalone application or as a component of the NVP monitoring application 116. As such, the illustrated embodiment should not be construed as being limiting in any way.

The computer system 102 and the NVP 104 also can be in communication with a metrics collection system 154 that collects past state data 156. The past state data 156 is another subset of the NVP data 106 that is collected based upon historical data about the NVP 104. Although metrics collection system 154 is illustrated as a system, the functionality of the metrics collection system 154 can be implemented as a standalone application or as a component of the NVP monitoring application 116. As such, the illustrated embodiment should not be construed as being limiting in any way.

The computer system 102 and the NVP 104 also can be in communication with a predictive analysis system 158 that generates future state data 160. The future state data 160 is another subset of the NVP data 106 that is generated based upon predictions about the NVP 104. Although the predictive analysis system 158 is illustrated as a system, the functionality of the predictive analysis system 158 can be implemented as a standalone application or as a component of the NVP monitoring application 116. As such, the illustrated embodiment should not be construed as being limiting in any way.

FIG. 1 illustrates one computer system 102, one NVP 104, one SDN network 112, one operating system 114, one NVP monitoring application 116, one visualization component 118, one user 136, one visualization 138, one UI 140, one display 142, one XR system 144, one input device 148, one real-time NVP monitoring system 150, one metrics collection system 154, and one predictive analysis system 158. It should be understood, however, that some implementations of the operating environment 100 can include multiple computer systems 102, multiple NVPs 104, multiple SDN networks 112, multiple operating systems 114, multiple NVP monitoring applications 116, multiple visualization components 118, multiple users 136, multiple visualizations 138, multiple UIs 140, multiple displays 142, multiple XR systems 144, multiple input devices 148, multiple real-time NVP monitoring systems 150, multiple metrics collection systems 154, and/or multiple predictive analysis systems 158. As such, the illustrated embodiment of the operating environment 100 should be understood as being illustrative, and should not be construed as being limiting in any way.

Figure 2:
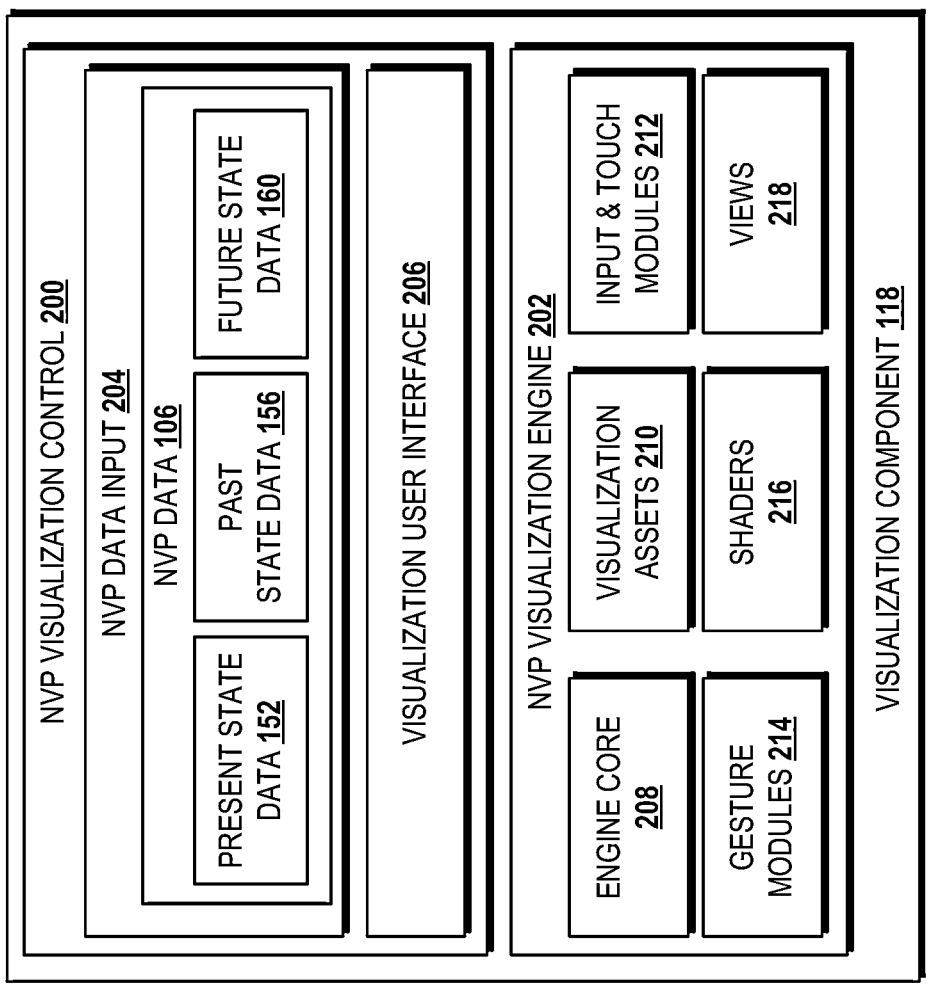
FIG. 2 is a block diagram illustrating aspects of a visualization component used by a computer system to generate a visualization of data associated with an NVP, according to an illustrative embodiment.

Turning now to FIG. 2, additional aspects of the visualization component 118 will be presented, according to one illustrative embodiment. In particular, FIG. 2 provides further details regarding architecture and subcomponents of the visualization component 118, according to some embodiments. The visualization component 118 can include a number of components and/or subsystems including, but not limited to, an NVP visualization control 200, an NVP visualization engine 202, and/or other components and/or sub systems.

The NVP visualization control 200 can include functionality to receive NVP data input 204, such as the NVP data 106 and/or subset thereof, including the present state data 152, the past state data 156, and the future state data 160, from the NVP 104. The NVP visualization control 200 also can include functionality of a visualization user interface 206 used to generate and present the UI 140 described herein above, via the display 142, and/or the XR system 144.

The NVP visualization engine 202 can include an engine core 208 for generating visualizations according to the concepts and technologies described herein, such as the visualization 138. The engine core 208 can utilize any software framework designed for the creation and development of graphics. Some example software frameworks include, but are not limited to, AUTOCAD (available from AUTODESK), BLENDER (available from the open source BLENDER FOUNDATION), UNREAL ENGINE (available from EPIC GAMES), UNITY (available from UNITY TECHNOLOGIES), CRYENGINE (available from CRYTEK), HAVOK VISION ENGINE (available from HAVOK), other proprietary software frameworks, open source software frameworks, combinations thereof, and the like.

The NVP visualization engine 202 also can include visualization assets 210 for representing application, network link, and/or other resources within visualizations; input and touch modules 212 for interpreting touch and/or multi-touch commands as input; gesture modules 214 for interpreting gesture commands as input; shaders 216 for providing shading of generated and/or rendered three-dimensional objects; and views 218 functionality for representing and/or interacting with different views of the visualization 138, including views representative of the present state data 152, the past state data 156, and the future state data 160.

The visualization component 118 also can include various other components and/or subsystems. For example, the visualization component 118 can include the temporal management component 120. The visualization component 118 also can include various graphics plugins and/or APIs such as the illustrated DIRECTX APIs, API call emulators, combinations thereof, or the like. It should be appreciated that the visualization component 118 can include additional and/or alternative functionality not shown in FIG. 2. As such, the embodiment illustrated in FIG. 2 should be understood as being illustrative and should not be construed as being limiting in any way.

Turning now to FIGS. 3A-3F, diagrams illustrating aspects of various aspects of an example visualization, such as the visualization 138, will be described, according to embodiments. Turning first to FIG. 3A, a connectivity view 300 shows a plurality of the applications 110 interconnected via at least a portion of the SDN network 112. The applications 110 are represented as circles of varying gray-scale shades. The SDN network 112 is represented as connection lines connecting the applications 110.

Turning now to FIG. 3B, a full view 302 (also referred to herein as a service graph view) shows a collection of available resources (such as application resources embodied as the applications 110) along with sequencing and relationships available to be used to process data plane service requests to instantiate a service instance of one or more of the services 108. A service graph describes the actual topology of the resources instantiated and operationalized by the NVP 104 within the SDN network 112. The full view 302 also shows a service path 304. The service path 304 shows a collection of specific resources from the service graph along with sequencing and relationships used to process a specific data plane service request. A service path describes a logical topology of the resources included in a particular instance of a service, such as one of the services 108. The illustrated service path 304 provided herein follows a flow convention of left-to-right.

A logical view of the service path 304 can be provided by a face plane view 306 of the visualization 138, such as in the example shown in FIG. 3C. The visualization 138 can provide a plurality of layers of the face plane view 306. In FIG. 3D, a slice view 308 of the visualization 138 represents one of these layers. Each of the layers can represent a physical technical plant ("TeP") location within the NVP 104. A specific resource 310 in a specific TeP location that is processing a particular data plane service request along the service path 304 can be identified by sliding out the corresponding layer for examination by the user 136 or by navigating into the visualization 138. A top plane view 312 is shown in FIG. 3E. The top plane view 312 shows the service path 304 across multiple layers of the face plane view—that is, multiple TeP locations within the NVP 104.

Figure 3G:
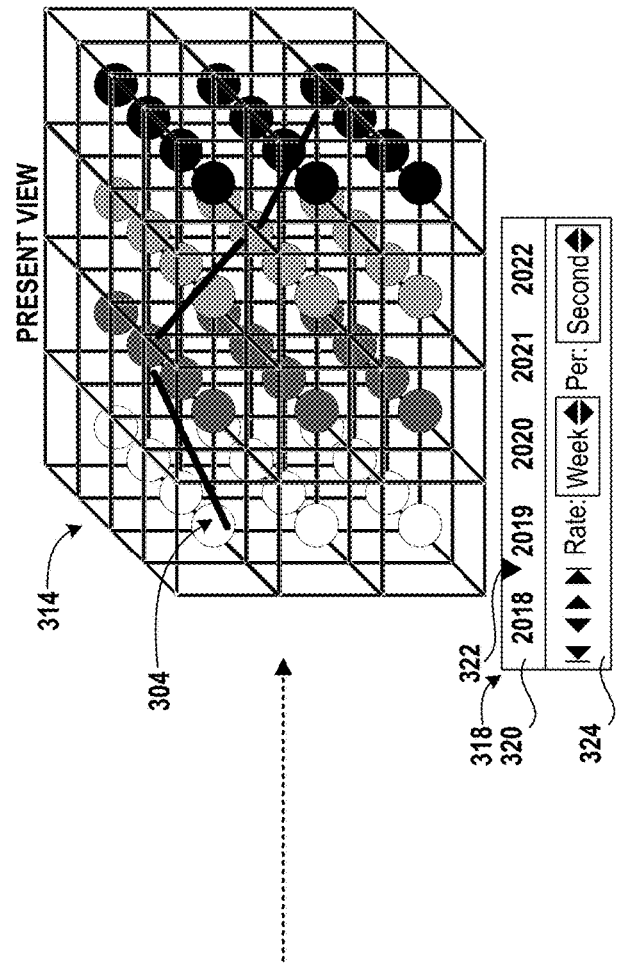
Figure 3F:
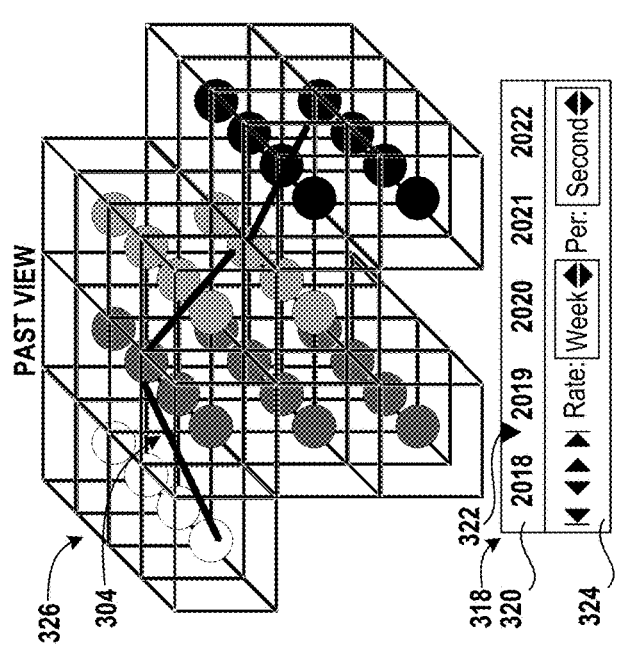

Turning now to FIG. 3F, a past view 326 is shown. The past view 326 represents a past service graph view based upon a past collection of resources (such as application resources embodied as the applications 110) available at some time in the past along with sequencing and relationships that were available to process data plane service requests and to instantiate a service instance of one or more of the services 108 in the past. The past view 326 describes a past actual topology of the resources instantiated and operationalized by the NVP 104 within the SDN network 112 based upon the past state data 156. The past view 326 also shows a past state of the service path 304. The service path 304 shows a collection of specific resources along with sequencing and relationships used to process a specific data plane service request in the past.

Turning now to FIG. 3G, a present view 314 is shown. The present view 314 represents a present service graph view based upon a present collection of resources (such as application resources embodied as the applications 110) currently available along with sequencing and relationships that are available to process data plane service requests and to instantiate a service instance of one or more of the services 108. The present view 314 describes the present actual topology of the resources currently instantiated and operationalized by the NVP 104 within the SDN network 112 based upon the present state data 152. The present view 314 also shows a present state the service path 304. The service path 304 shows a present collection of specific resources along with sequencing and relationships used to process a specific data plane service request.

Figure 3H:
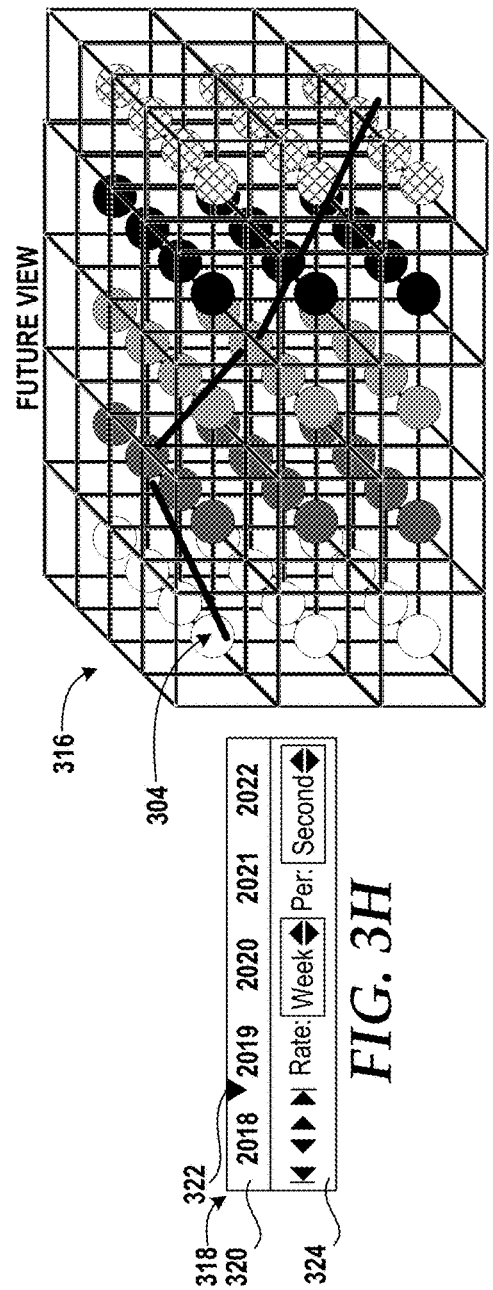

Turning now to FIG. 3H, a future view 316 is shown. The future view 316 represents a future service graph view based upon a future collection of resources (such as application resources embodied as the applications 110) predicted to be available in the future along with sequencing and relationships that are predicted to be available to process data plane service requests and to instantiate a service instance of one or more of the services 108. The future view 316 describes a future actual topology of the resources to be instantiated and operationalized by the NVP 104 within the SDN network 112 based upon the future state data 160. The future view 316 also shows the service path 304. The service path 304 shows a future collection of specific resources along with sequencing and relationships to be used to process a specific data plane service request.

FIGS. 3F-3H also illustrate a temporal management function 318 that is created and managed by the temporal management component 120. The user 136 can interact with the temporal management function 318 to select a specific time, including a time in the past, present, or future, and to be presented with either the past view 326, the present view 314, or the future view 316 based upon the selection. In the illustrated example, the temporal management function 318 includes a timeline 320 with time intervals in one year increments, although the temporal management function 318 may include different time increments such as seconds, minutes, days, hours, weeks, months, or any division or multiple thereof. Moreover, the illustrated example of the temporal management function 318 shows a pointer 322 that the user 136 can interact with (e.g., select with a mouse, keyboard, or touchscreen) to select a specific time from which to view the visualization 138. The illustrated temporal management function 318 also includes a temporal management control 324 with controls for moving/scrubbing through the timeline 320. The illustrated example for the temporal management control 324 includes controls for forward and reverse, and selecting different time period and time units. Additional details about the temporal management control 324 are illustrated and described herein below with reference to FIG. 17. It is contemplated that the user 136 may be provided with additional or alternative ways to interact with the temporal management function 318, such as by way of gestures, other interactions, and/or other user interface elements. The XR system 144 may provide additional interactivity with the temporal management function 318 such as the user 136 flying through the visualization 138 as if flying to the past or the future.

Figure 4:
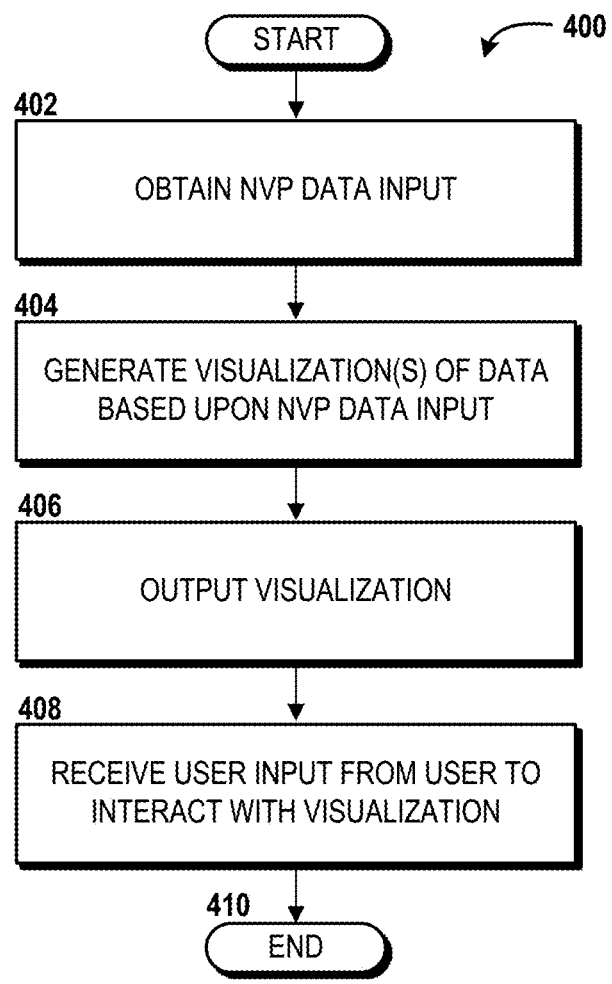
FIG. 4 is a flow diagram illustrating aspects of a method for generating a visualization of NVP data, according to an illustrative embodiment.

Turning now to FIG. 4, aspects of a method 400 for generating a visualization 138 of the NVP 104 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of the computer system 102, a processor of the NVP 104, a processor of the real-time NVP monitoring system 150, a processor of the metrics collection system 154, a processor of the predictive analysis system 158, a processor of the XR system 144, a processor of the compute resources 126, and/or a processor one or more other computing systems and/or devices disclosed herein to perform operations.

For purposes of illustrating and describing some of the concepts of the present disclosure, the methods disclosed herein are described as being performed via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 will be described with reference to FIG. 4 and further reference to FIGS. 1, 2, and 3A-3E. The method 400 begins and proceeds to operation 402. At operation 402, the computer system 102 obtains the NVP data input 204 associated with the NVP 104. The NVP data input 204 can include the NVP data 106, the current state data 152, the past state data 156, the future state data 160, or some combination thereof as shown in FIG. 2. From operation 402, the method 400 proceeds to operation 404. At operation 404, the computer system 102 can generate, based upon the NVP data input 204, one or more visualizations of the NVP data 106, such as the visualization 138 in one or more of the views illustrated in FIGS. 3A-3H. From operation 404, the method 400 proceeds to operation 406. At operation 406, the computer system 102 outputs the visualization 138 to the display 142, and/or the XR system 144.

From operation 406, the method 400 proceeds to operation 408. At operation 408, the computer system 102 receives user input from the user 136 via the visualization user interface 206 to perform one or more actions to interact with the visualization 138. The actions can include input received by the computer system 102 via the display 142, the XR system 144, the input device(s) 148, or some combination thereof. The actions can include movement actions such as, but not limited to, pan up, pan down, pan left, pan right, rotate clockwise, rotate counter-clockwise, tilt down, tilt up, zoom in, zoom out, field-of-view increase, field-of-view decrease, and the like. The movement actions can be used to navigate the visualization 138, including moving back through time into the past to view past version of the visualization 138 and moving forward through time into the future to view predicted future versions of the visualization 138. Other actions to add, delete, and/or modify at least a portion of the visualization 138 also are contemplated. From operation 408, the method 400 proceeds to operation 410. The method 400 can end at operation 410.

Figure 5:
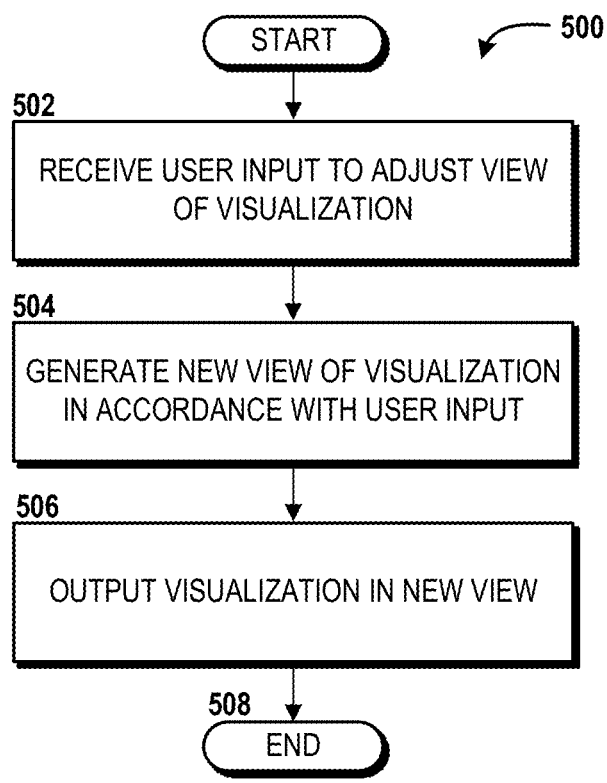
FIG. 5 is a flow diagram illustrating aspects of a method for adjusting a new view of a visualization of NVP data, according to an illustrative embodiment.

Turning now to FIG. 5, a method 500 for adjusting a view of a visualization 138 of the NVP 104 will be described in detail, according to an illustrative embodiment. The method 500 will be described from the perspective of the computer system 102.

The method 500 begins and proceeds to operation 502. At operation 502, the computer system 102 receives input from the user 136 to adjust a view of the visualization 138. In some embodiments, the visualization user interface 206 can present one or more user interface elements, each of which can be representative of one or more of the views 218, some examples of which are shown in FIGS. 3A-3I. For example, the visualization user interface 206 may present thumbnail images that are representative of each of the views. Text descriptions, icons, and the like are also contemplated.

From operation 502, the method 500 proceeds to operation 504. At operation 504, the computer system 102 generates a new view of the visualization 138 in accordance with the user input. Examples of some illustrative views are provided herein in FIGS. 3A-3I. From operation 504, the method 500 proceeds to operation 506. At operation 506, the computer system 102 outputs the visualization 138 in the new view. From operation 506, the method 500 proceeds to operation 508. The method 500 can end at operation 508.

Figure 6:
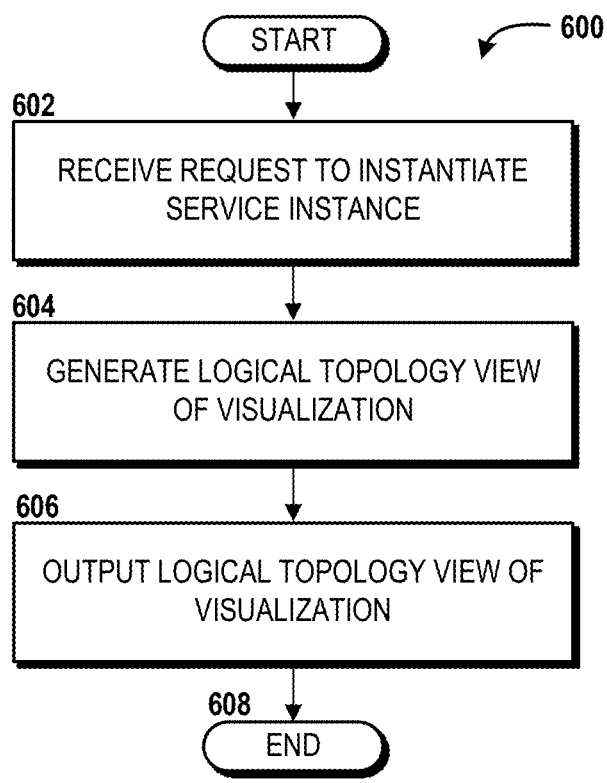
FIG. 6 is a flow diagram illustrating aspects of a method for generating a logical topology view of a visualization of NVP data, according to an illustrative embodiment.

Turning now to FIG. 6, a method 600 for generating a logical topology view of a visualization 138 of the NVP 104 when a new service or a new service instance is instantiated by the NVP 104 will be described in detail, according to an illustrative embodiment. The method 600 will be described from the perspective of the computer system 102.

The method 600 begins and proceeds to operation 602. At operation 602, the computer system 102 receives a request to instantiate a new service instance for one of the services 108. From operation 602, the method 600 proceeds to operation 604. At operation 604, the computer system 102 generates a logical topology view, such as the face plane view 306 shown in FIG. 3C, for a service path representing the newly-instantiated service instance. From operation 604, the method 600 proceeds to operation 606. At operation 606, the computer system 102 outputs the logical topology view of the visualization 138. From operation 606, the method 600 proceeds to operation 608. The method 600 can end at operation 608.

Figure 7:
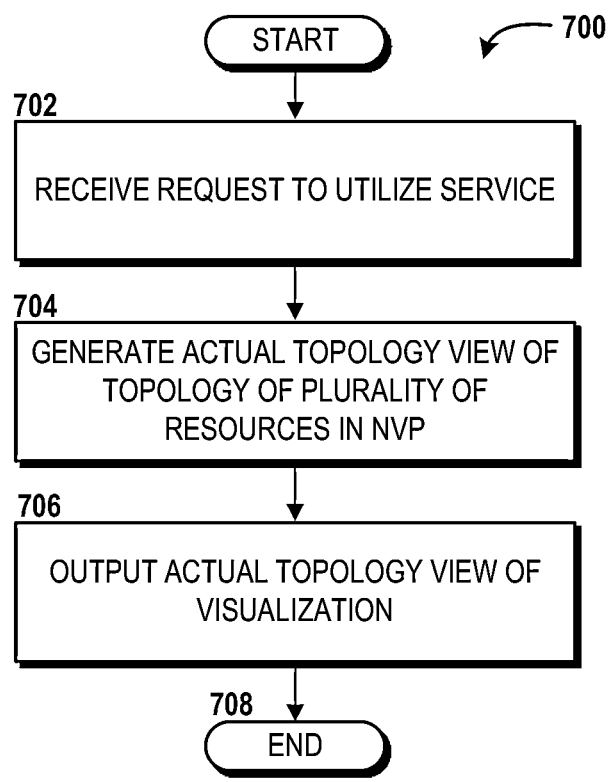
FIG. 7 is a flow diagram illustrating aspects of a method for generating an actual topology view of a visualization of NVP data, according to an illustrative embodiment.

Turning now to FIG. 7, a method 700 for generating actual topology view of a visualization 138 of the NVP 104 in response to a request to utilize a service 108 will be described in detail, according to an illustrative embodiment. The method 700 will be described from the perspective of the computer system 102.

The method 700 begins and proceeds to operation 702. At operation 702, the computer system 102 receives a request to utilize one of the services 108. From operation 702, the method 700 proceeds to operation 704. At operation 704, the computer system 102 generates an actual topology view, such as the slice view 308 shown in FIG. 3D. From operation 704, the method 700 proceeds to operation 706. At operation 706, the computer system 102 outputs the actual topology view of the visualization 138. From operation 706, the method 700 proceeds to operation 708. The method 700 can end at operation 708.

Figure 8:
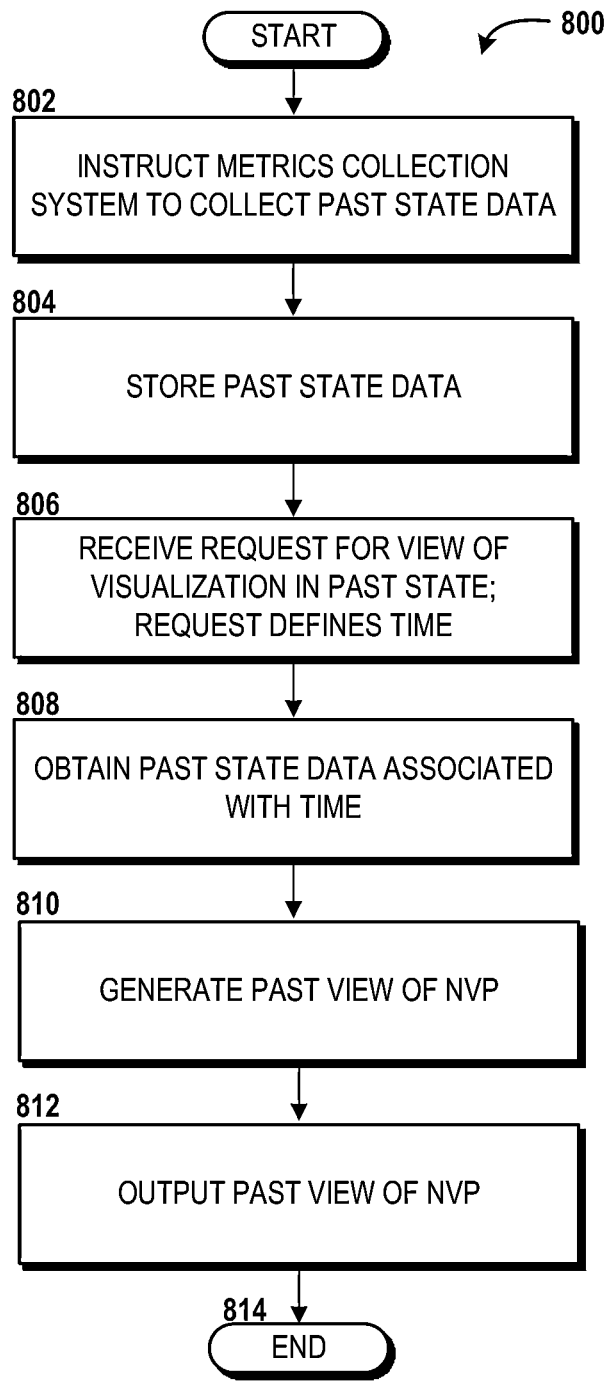
FIG. 8 is a flow diagram illustrating aspects of a method for generating a present view of a visualization of NVP data, according to an illustrative embodiment.

Turning now to FIG. 8, a method 800 for generating a past view 326 of a visualization 138 of the NVP 104 will be described in detail, according to an illustrative embodiment. The method 800 will be described from the perspective of the computer system 102 and the metrics collection system 154.

The method 800 begins and proceeds to operation 802. At operation 802, the computer system 102 instructs the metrics collection system to collect the past state data. In some embodiments, the computer system 102 can instruct the metrics collection system to collect the past state data periodically. In other embodiments, the computer system 102 can instruct the metrics collection system to collect the past state data based upon a schedule.

From operation 802, the method 800 proceeds to operation 804. At operation 804, the computer system stores the past state data in a memory and/or other storage device. The computer system may store the past state data locally and/or remotely. The past state data can include a time stamp associated with the time at which the past state data was collected. The past state data therefore is representative of the visualization at the specific past time identified by the time stamp.

From operation 804, the method 800 proceeds to operation 806. At operation 806, the computer system receives a request for a view of the NVP 104 in a past state (e.g., the past view 326 shown in FIG. 3F). The request can define a time and may be received through the temporal management function. In the example of the past view 326 shown in FIG. 3F, the temporal management function 318 is embodied as a timeline. Accordingly, the request may be derived from the user 136 moving the pointer 320 along the timeline 314 to the desired time. The temporal management function 318 may be implemented in alternative ways as described herein.

From operation 806, the method 800 proceeds to operation 808. At operation 808, the computer system obtains the past data associated with the time defined in the request. In particular, the computer system may query the memory and/or other storage device in which the past state data was stored at operation 804. The query can identify the time and the memory and/or other storage device can provide the past data associated with the time stamp that matches the time.

From operation 808, the method 800 proceeds to operation 810. At operation 810, the computer system 102 generates a past view 326 of the NVP 104. From operation 810, the method 800 proceeds to operation 812. At operation 812, the computer system 102 outputs the past view 326 of the NVP 104. From operation 812, the method 800 proceeds to operation 814. The method 800 can end at operation 814.

Figure 9:
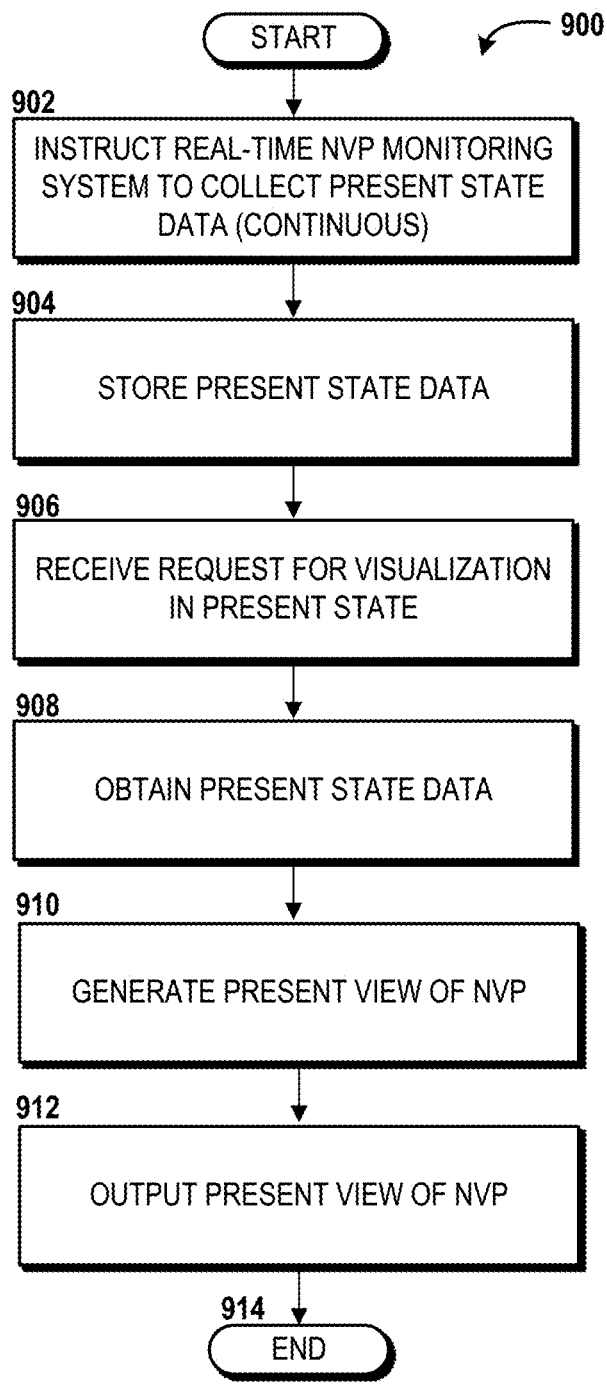
FIG. 9 is a flow diagram illustrating aspects of a method for generating a past view of a visualization of NVP data, according to an illustrative embodiment.

Turning now to FIG. 9, a method 900 for generating a present view 314 of a visualization 138 of the NVP 104 will be described in detail, according to an illustrative embodiment. The method 900 will be described from the perspective of the computer system 102 and the real-time NVP monitoring system 150.

The method 900 begins and proceeds to operation 902. At operation 902, the computer system 102 instructs the real-time NVP monitoring system to collect the present state data. In some embodiments, the computer system 102 instructs the real-time NVP monitoring system to collect the present state data continuously such that the present state data is always available to generate the present view 314. Moreover, this continuous collection can enable the computer system 102 to generate the present view 314 as an animated view that continually updates to reflect real-time conditions of the NVP 104. In other embodiments, the computer system 102 instructs the real-time NVP monitoring system to collect the present state data in response to a specific request.

From operation 902, the method 900 proceeds to operation 904. At operation 904, the computer system stores the present state data in a memory and/or other storage device. The computer system may store the present state data locally and/or remotely. The computer system may continually update the present state data stored in the memory and/or other storage device such that the present state data is always representative of the present state of the NVP 104. In some embodiments, the present state data can be time stamped and stored as past state data in addition to or as a substitute for the past state data 156 received from the metrics collection system 154. It is contemplated that the real-time NVP monitoring system 150 may feed the present state data 152 into the metrics collection system 154, which can time stamp the present state data 152 as part of the past state data 156. In this manner, the interaction between the computer system 102 and real-time monitoring system 150 can be used exclusively for the exchange of the latest data that is representative of the state of the NVP 104.

From operation 904, the method 900 proceeds to operation 906. At operation 906, the computer system receives a request for a view of the visualization 138 of the NVP 104 in the present state. From operation 906, the method 900 proceeds to operation 908. At operation 908, the computer system obtains the present state data from the memory and/or other storage device. From operation 908, the method 900 proceeds to operation 910. At operation 910, the computer system 900 generates a present view 314 of the NVP 104. In some embodiments, the present view 314 can provide an animated view of the NVP 104. In these embodiments, the computer system may continuously obtain the present state data and generate frames of the present view 314 that can be presented continuously as the present state data changes over time. From operation 910, the method 900 proceeds to operation 912. At operation 912, the computer system 102 outputs the present view 314 of the NVP 104. From operation 912, the method 900 proceeds to operation 914. The method 900 can end at operation 914.

Figure 10:
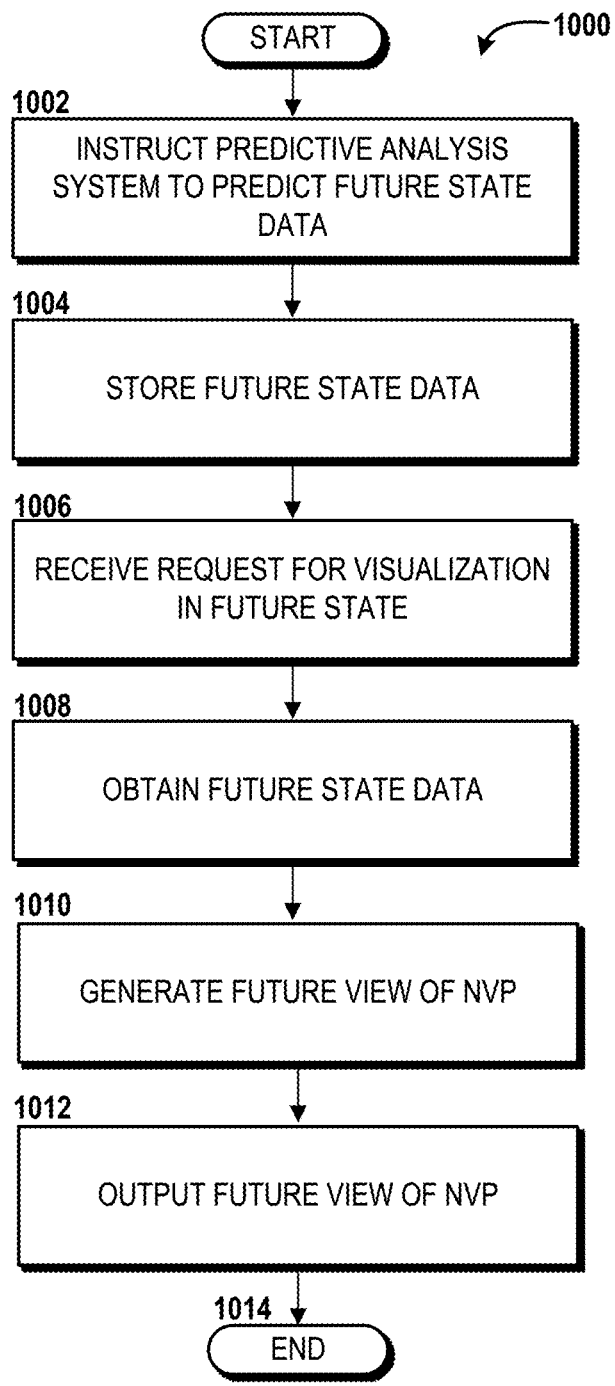
FIG. 10 is a flow diagram illustrating aspects of a method for generating a future view of a visualization of NVP data, according to an illustrative embodiment.

Turning now to FIG. 10, a method 1000 for generating a future view 316 of the visualization 138 of the NVP 104 will be described in detail, according to an illustrative embodiment. The method 1000 will be described from the perspective of the computer system 102 and the predictive analysis system 158.

The method 1000 begins and proceeds to operation 1002. At operation 1002, the computer system 102 instructs the predictive analysis system 158 to predict the future state data 160. The predictive analysis system 158 can implement one or more algorithms based upon the data (e.g., the NVP data 106) being analyzed. Some example algorithms include, but are not limited to, a random number generator, an average of past values, a moving average, an exponential moving average, a Monte Carlo simulation technique, linear functions, and non-linear functions that may be used to predict the future state data 160. In some embodiments, the predictive analysis system 158 can utilize machine learning techniques, such as described herein below with reference to FIG. 16.

From operation 1002, the method 1000 proceeds to operation 1004. At operation 1004, the computer system 102 stores the future state data 160 in a memory and/or other storage device. The computer system 102 may store the future state data 160 locally and/or remotely. The future state data 160 can include a time stamp associated with the time for which the future state data 160 was predicted. The future state data 160 therefore is representative of the visualization at the specific future time identified by the time stamp.

From operation 1004, the method 1000 proceeds to operation 1006. At operation 806, the computer system receives a request for a view of the NVP 104 in a future state (e.g., the future view 316 shown in FIG. 3G). The request can define a time and may be received through the temporal management function. In the example of the future view 316 shown in FIG. 3G, the temporal management function 318 is embodied as a timeline. Accordingly, the request may be derived from the user 136 moving the pointer 320 along the timeline 314 to the desired future time. The temporal management function 318 may be implemented in alternative ways as described herein.

From operation 1006, the method 1000 proceeds to operation 1008. At operation 1008, the computer system 102 obtains the future state data 160 associated with the future time defined in the request. In particular, the computer system 102 may query the memory and/or other storage device in which the future state data 160 was stored at operation 1004. The query can identify the time and the memory and/or other storage device can provide the future data associated with the time stamp that matches the time.

From operation 1008, the method 1000 proceeds to operation 1010. At operation 1010, the computer system 102 generates a future view 316 of the NVP 104. From operation 1010, the method 1000 proceeds to operation 1012. At operation 1012, the computer system 102 outputs the future view 316 of the NVP 104. From operation 1012, the method 1000 proceeds to operation 1014. The method 1000 can end at operation 1014.

Figure 11:
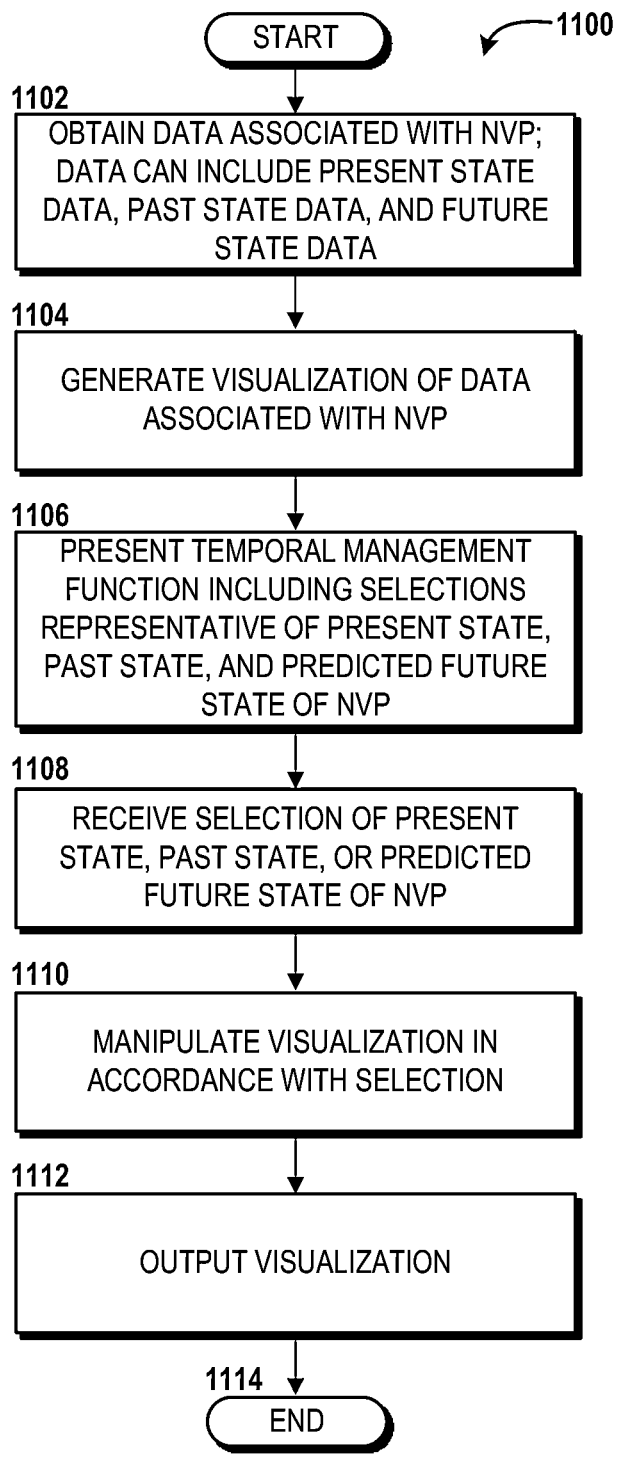
FIG. 11 is a flow diagram illustrating aspects of a method for manipulating a visualization of NVP data based upon time, according to an illustrative embodiment.

Turning now to FIG. 11, a method 1100 for manipulating a visualization 138 of the NVP 104 based upon time will be described in detail, according to an illustrative embodiment. The method 1100 will be described from the perspective of the computer system 102. The method 1100 begins and proceeds to operation 1102. At operation 1102, the computer system 102 obtains data associated with the NVP 104. This data can include the present state data, the past state data, the future state data 160, or some combination thereof. From operation 1102, the method 1100 proceeds to operation 1104. At operation 1104, the computer system 102 generates the visualization 138 of the data associated with the NVP 104. The initial version of the visualization 138 may be generated based upon the present state data as default. The user 136 may elect for the computer system 102 to generate the initial version of the visualization 138 based upon the past state data or the future state data 160. As such, the visualization user interface 206 can present different options for the type of data to be used to generate the initial version of the visualization 138.

From operation 1104, the method 1100 proceeds to operation 1106. At operation 1106, the computer system 102 presents the temporal management function. The temporal management function may be implemented in different ways such as a timeline as shown in FIGS. 3F-3H and/or other user interface elements. Regardless of the implementation details, the temporal management function can include a plurality of selections that are representative of the present state, the past state, and the predicted future state of the NVP 104. As shown in FIGS. 3F-3H, the temporal management function 318 includes selections based upon one year increments from 2018 to 2022, with the present state of the NVP 104 shown as being associated with the year 2020.

From operation 1106, the method 1100 proceeds to operation 1108. At operation 1108, the computer system 102 receives a selection of the present state, the past state, or the predicted future state of the NVP 104. As shown in FIGS. 3F-3H, the user 136 can make the selection by positioning the pointer 320 along the temporal management function 318 (shown as a timeline in the illustrated embodiment). It should be understood that the selection may be an ongoing process as the user 136 moves the pointer 320 along the timeline.

From operation 1108, the method 1100 proceeds to operation 1110. At operation 1110, the computer system 102 manipulates the visualization in accordance with the selection. In some embodiments, the computer system 102 manipulates the visualization in real-time such that the visualization 138 transitions from one state to another. This may appear as if the visualization is morphing from one state to another. For example, the user 136 may pause, fast forward (towards the future state), or rewind (towards the past state) by repositioning the pointer 320 along the timeline. From operation 1110, the method 1100 proceeds to operation 1112. At operation 1112, the computer system 102 outputs the visualization. It should be understood that the operations 1108, 1110, and 1112 can be repeated as the user 136 continues to interact with the temporal management function to manipulate the visualization through time.

From operation 1112, the method 1100 proceeds to operation 1114. The method 1100 can end at operation 1114.

Figure 12:
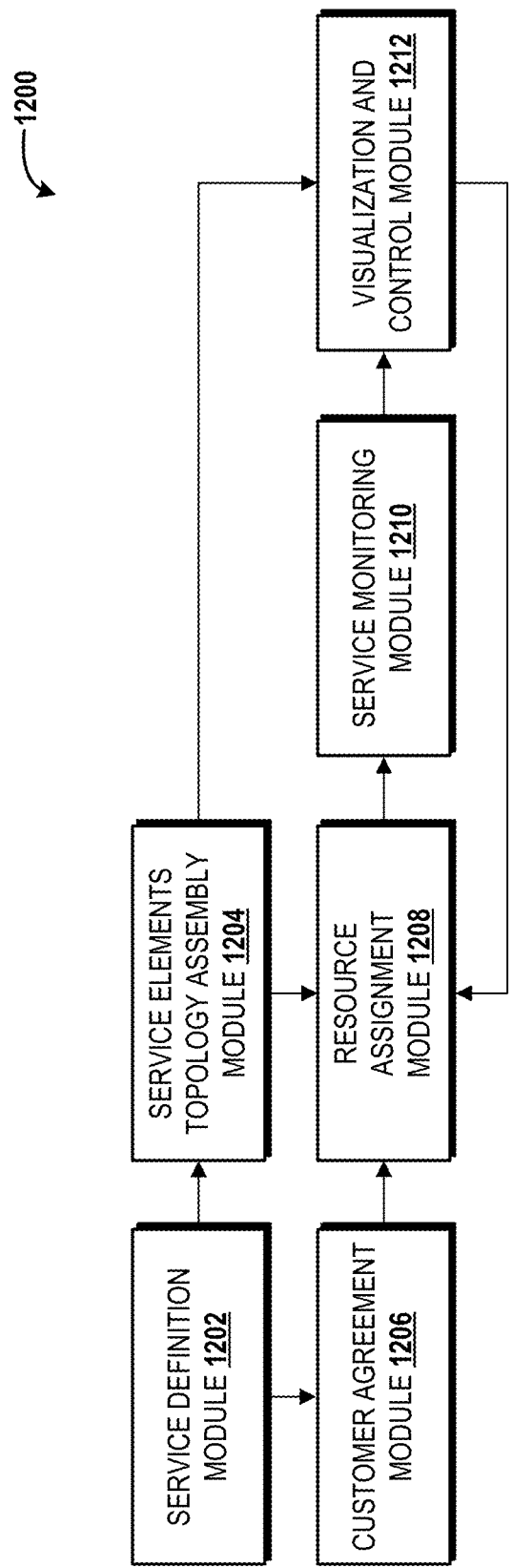
FIG. 12 is a block diagram illustrating a plurality of modules associated with an NVP monitoring application and a visualization component that can be executed by a computer system to perform various operations to facilitate user interaction with a visualization, according to an illustrative embodiment.

Turning now to FIG. 12, a block diagram illustrating a plurality of modules 1200 associated with the NVP monitoring application 116 and the visualization component 118 that can be executed by the computer system 102 (all best shown in FIG. 1) to perform various operations to facilitate user interaction with a visualization, such as the visualization 138 (shown in FIG. 1), some illustrative examples of which are shown in FIGS. 3A-3E, will be described. The plurality of modules 1200 can be executed by the computer system 102 to perform service management operations, and specifically end-to-end service quality management ("E2E SQM") visualization and control. The plurality of modules 1200 includes a service definition module 1202, a service elements topology assembly module 1204, a customer agreement module 1206, a resource assignment module 1208, a service monitoring module 1210, and a visualization and control module 1212. The plurality of modules 1200 can be interacted with by one or more users, such as the user 136, who might be a service designer, a service engineer, a service salesperson, or the like.

The service definition module 1202 can allow a service designer to define, via a user interface such as the user interface 140 (shown in FIG. 1), a service, such as one of the services 108 (also shown in FIG. 1). The service definition module 1202 can provide input received from the service designer to the service elements topology assembly module 1204. The service definition module 1202 can allow a service engineer to identify service elements needed and a topology that chains the service elements in order to effect instances of the service when requested.

Based on overall end-to-end throughput that can be achieved from resources needed to instantiate the service, a dimensioning profile can be established by the resource assignment module 1208. The dimensioning profile can set one or more objectives with regard to predictions of end-to-end transaction throughput achieved by certain sizes of resources for typical demand curves to within statistical availability requirements (e.g., five 9's).

Salespeople can utilize the customer agreement module 1206 to gain customer's agreement to use the service. The resource assignment module 1208 can provision resources and can provide the service based on the customer's anticipated level of demand in accordance with the customer's agreement.

Once instantiated, the service monitoring module 1210 can monitor the service for compliance with general objectives as well as specific agreements made with particular customers. The visualization and control module 1212 can provide the visualization 138. The visualization 138 can provide a way to visualize the currently active topology of an instantiated service, the resource state of the service, and the end-to-end service quality being delivered to the customer. The visualization and control module 1212 also can provide the user interface 140 for the control and adjustment of resources assigned by the resource assignment module 1208 to provide or augment the service execution, providing a closed-loop control system for adjusting QoS.

Figure 13:
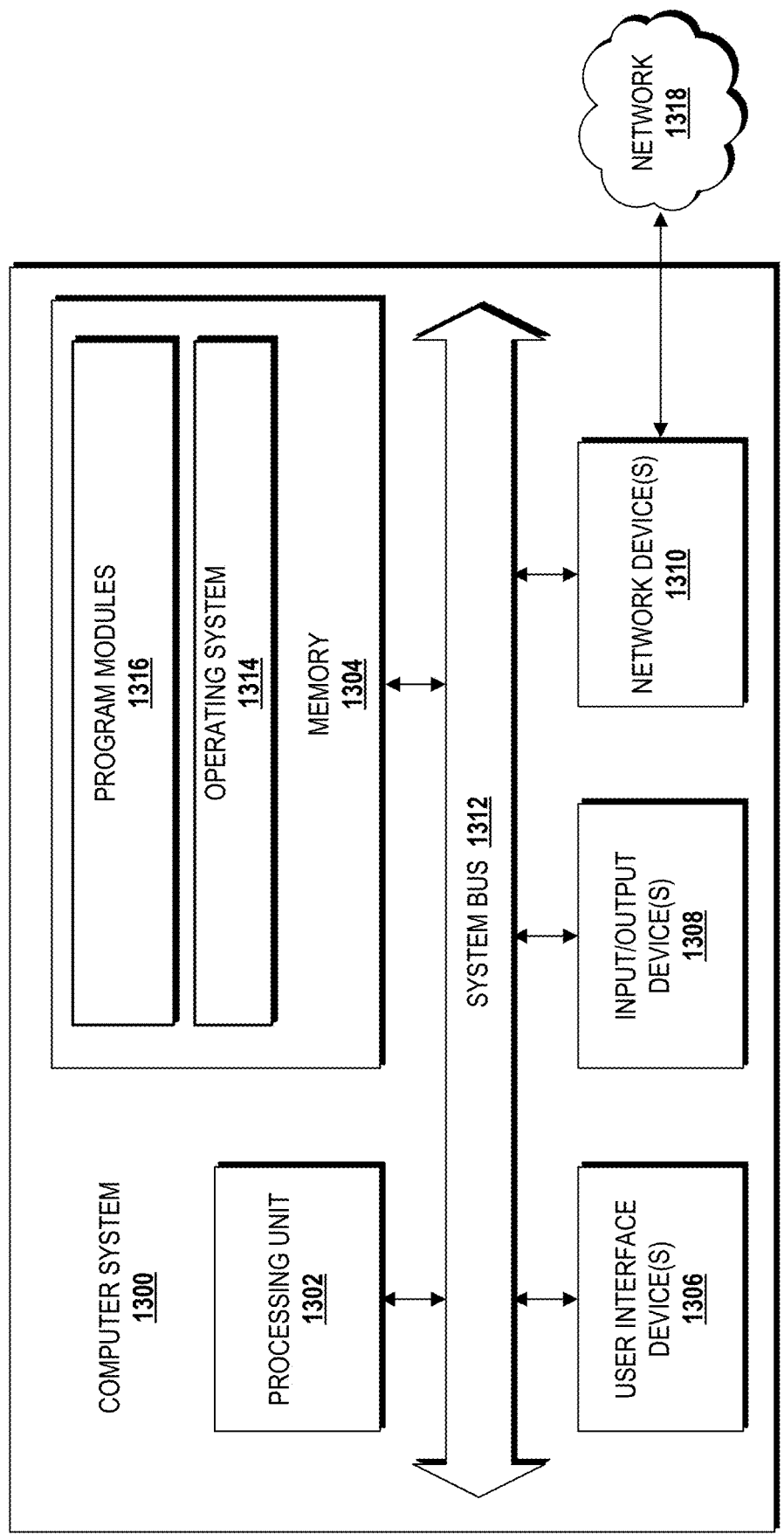
FIG. 13 is a block diagram illustrating an example computer system capable of implementing aspects of the embodiments presented herein.

FIG. 13 is a block diagram illustrating a computer system 1300 configured to provide the functionality in accordance with various embodiments of the concepts and technologies disclosed herein. In some implementations, at least a portion of the hardware resources in the hardware resource layer 121 (best illustrated in FIG. 1) are provided, at least in part, by one or more host server computers (collectively, "host server cluster"), which is/are configured like the architecture of the computer system 1300. It should be understood, however, that modification to the architecture may be made to facilitate certain interactions among elements described herein. In some implementations, the compute resources 126, the memory resources 128 and/or the other resources 130 are configured like the architecture of the computer system 1300 or portions thereof. In some implementations, the computer system 102, the XR system 144, the real-time NVP monitoring system 150, the metrics collection system 154, and/or the predictive analysis system 158 is/are configured like the architecture of the computer system 1300 or portions thereof.

The computer system 1300 includes a processing unit 1302, a memory 1304, one or more user interface devices 1306, one or more input/output ("I/O") devices 1308, and one or more network devices 1310, each of which is operatively connected to a system bus 1312. The bus 1312 enables bi-directional communication between the processing unit 1302, the memory 1304, the user interface devices 1306, the I/O devices 1308, and the network devices 1310.

The processing unit 1302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 126 can include one or more instances of the processing units 1302.

The memory 1304 communicates with the processing unit 1302 via the system bus 1312. In some embodiments, the memory 1304 is operatively connected to a memory controller (not shown) that enables communication with the processing unit 1302 via the system bus 1312. The memory resources 128 can include one or more instances of the memory 1304. The illustrated memory 1304 includes an operating system 1314 and one or more program modules 1316.

The operating system 1314 can include the operating system 114 of the computer system 102 best shown in FIG. 1. The operating system 1314 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, the ANDROID OS family of operating systems from GOOGLE INC., other operating systems, and the like.

The program modules 1316 may include various software and/or program modules to perform the various operations described herein. For example, the program modules can include the NVP monitoring application 116 and the visualization component 118 of the computer system 102 best shown in FIG. 1, and more particularly, the plurality of modules associated with the method 800 described above with reference to FIG. 8. The program modules 1316 and/or other programs can be embodied in computer-readable media containing instructions that, when executed by the processing unit 1302, perform various operations such as those described herein. According to embodiments, the program modules 1316 may be embodied in hardware, software, firmware, or any combination thereof.

By way of example, and not limitation, computer-readable media may include any available computer storage media or communication media that can be accessed by the computer system 1300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer system 1300. In the claims, the phrase "computer storage medium," "computer-readable storage medium," and variations thereof does not include waves or signals per se and/or communication media, and therefore should be construed as being directed to "non-transitory" media only.

The user interface devices 1306 may include one or more devices with which a user accesses the computer system 1300. The user interface devices 1306 may include, but are not limited to, computers, servers, personal digital assistants, cellular phones, or any suitable computing devices. The I/O devices 1308 enable a user to interface with the program modules 1316. In one embodiment, the I/O devices 1308 are operatively connected to an I/O controller (not shown) that enables communication with the processing unit 1302 via the system bus 1312. The I/O devices 1308 may include one or more input devices, such as, but not limited to, a keyboard, a mouse, or an electronic stylus. Further, the I/O devices 1308 may include one or more output devices, such as, but not limited to, a display screen or a printer.

The network devices 1310 enable the computer system 1300 to communicate with other networks or remote systems via a network 1318, which can include the SDN network 112 and/or other networks described herein. Examples of the network devices 1310 include, but are not limited to, a modem, a radio frequency ("RF") or infrared ("IR") transceiver, a telephonic interface, a bridge, a router, or a network card. The network 1318 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 1318 may be a wired network such as, but not limited to, a wide area network ("WAN"), a wired LAN such as provided via Ethernet, a wired personal area network ("PAN"), or a wired metropolitan area network ("MAN").

Figure 14:
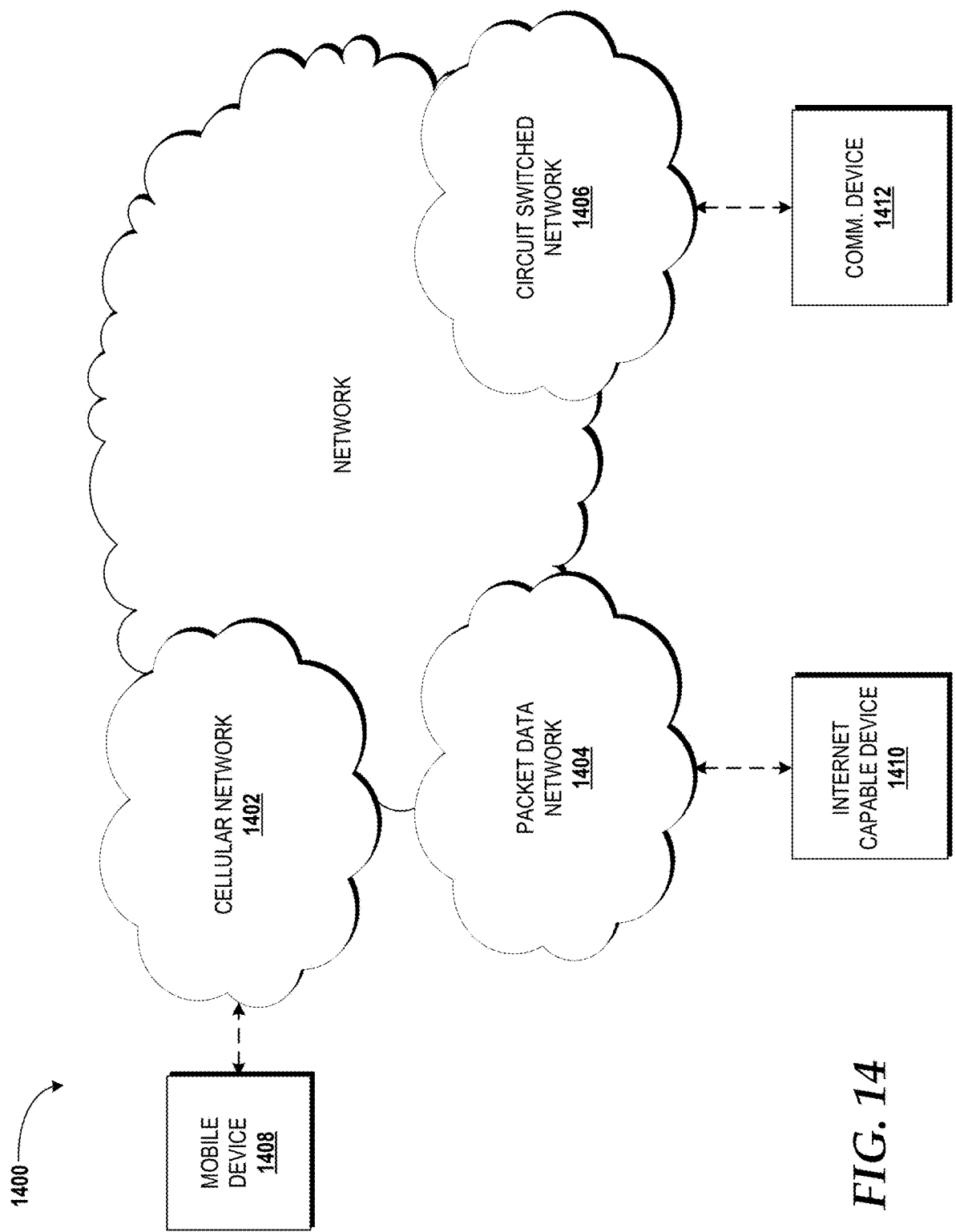
FIG. 14 schematically illustrates a network, according to an illustrative embodiment.

Turning now to FIG. 14, additional details of a network 1400, such as the network 1318, are illustrated, according to an illustrative embodiment. The network 1400 includes a cellular network 1402, a packet data network 1404, for example, the Internet, and a circuit switched network 1406, for example, a publicly switched telephone network ("PSTN"). The cellular network 1402 includes various components such as, but not limited to, base transceiver stations ("BTSs"), Node-B's or e-Node-B's, base station controllers ("B SCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1402 also includes radios and nodes for receiving and transmitting voice, data, and combinations thereof to and from radio transceivers, networks, the packet data network 1404, and the circuit switched network 1406.

A mobile communications device 1408, such as, for example, the computer system 102, a cellular telephone, a user equipment, a mobile terminal, a PDA, a laptop computer, a handheld computer, and combinations thereof, can be operatively connected to the cellular network 1402. The cellular network 1402 can be configured as a 2G Global System for Mobile communications ("GSM") network and can provide data communications via General Packet Radio Service ("GPRS") and/or Enhanced Data rates for GSM Evolution ("EDGE"). Additionally, or alternatively, the cellular network 1402 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced UpLink ("EUL") (also referred to as High-Speed Uplink Packet Access ("HSUPA")), and HSPA+. The cellular network 1402 also is compatible with 4G mobile communications standards such as Long-Term Evolution ("LTE"), 5G mobile communications standards, or the like, as well as evolved and future mobile standards.

The packet data network 1404 includes various devices, for example, servers, computers, databases, and other devices in communication with one another, as is generally known. The packet data network 1404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1404 includes or is in communication with the Internet. The circuit switched network 1406 includes various hardware and software for providing circuit switched communications. The circuit switched network 1406 may include, or may be, what is often referred to as a plain old telephone system ("POTS"). The functionality of a circuit switched network 1406 or other circuit-switched network are generally known and will not be described herein in detail.

The illustrated cellular network 1402 is shown in communication with the packet data network 1404 and a circuit switched network 1406, though it should be appreciated that this is not necessarily the case. One or more Internet-capable devices 1410, for example, the computer system 102, a PC, a laptop, a portable device, or another suitable device, can communicate with one or more cellular networks 1402, and devices connected thereto, through the packet data network 1404. It also should be appreciated that the Internet-capable device 1410 can communicate with the packet data network 1304 through the circuit switched network 1406, the cellular network 1402, and/or via other networks (not illustrated).

As illustrated, a communications device 1412, for example, a telephone, facsimile machine, modem, computer, or the like, can be in communication with the circuit switched network 1406, and therethrough to the packet data network 1404 and/or the cellular network 1402. It should be appreciated that the communications device 1412 can be an Internet-capable device, and can be substantially similar to the Internet-capable device 1410. In the specification, the network 1400 is used to refer broadly to any combination of the networks 1402, 1404, 1406. It should be appreciated that substantially all of the functionality described with reference to the network 1400 can be performed by the cellular network 1402, the packet data network 1404, and/or the circuit switched network 1406, alone or in combination with other networks, network elements, and the like.

Figure 15:
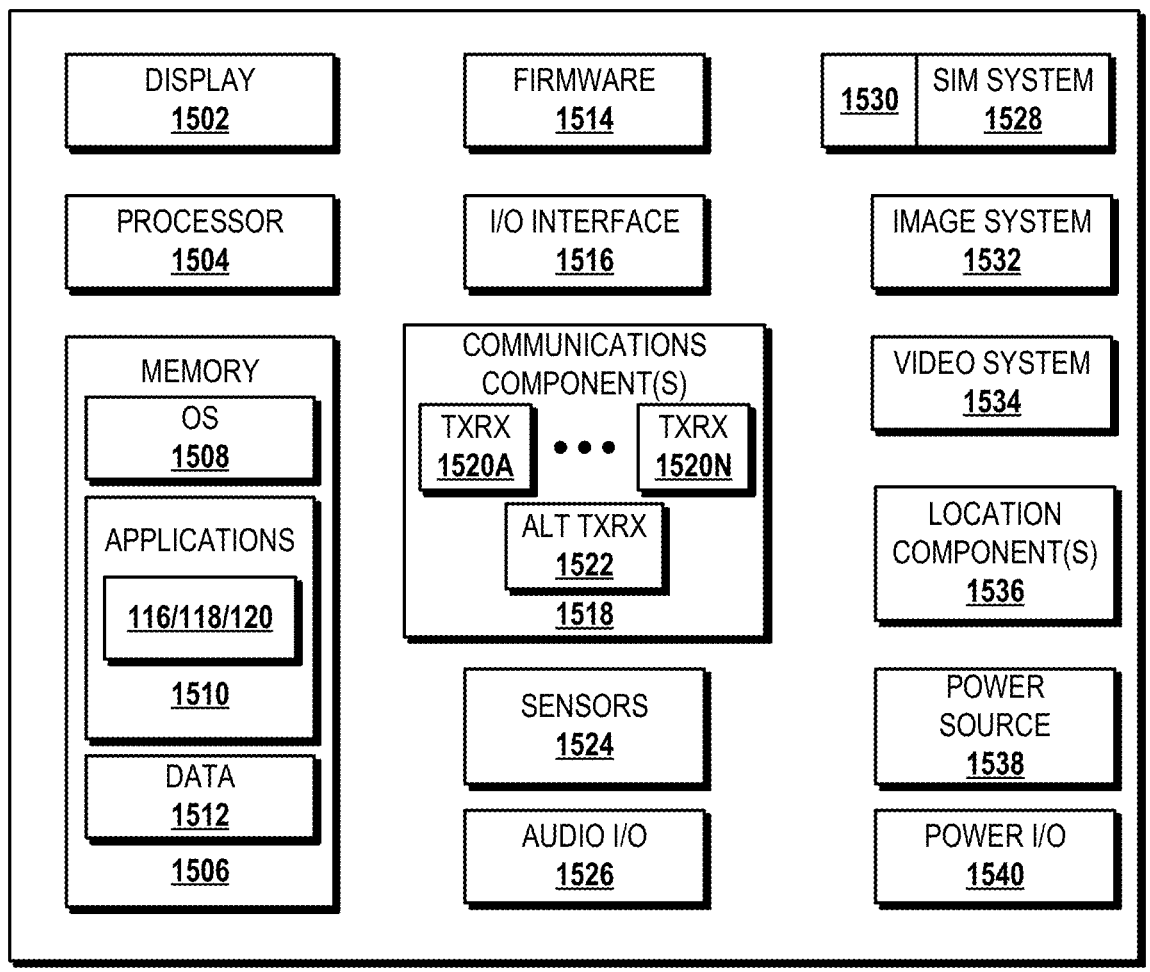
FIG. 15 is a block diagram illustrating an example mobile device and components thereof, according to an illustrative embodiment.

Turning now to FIG. 15, an illustrative mobile device 1500 and components thereof will be described. In some embodiments, the computer system 102, the XR system 144, the real-time NVP monitoring system 150, the metrics collection system 154, and/or the predictive analysis system 158 described above with reference to FIG. 1 can be configured as and/or can have an architecture similar or identical to the mobile device 1500 described herein in FIG. 15. It should be understood, however, that the computer system 102, the XR system 144, the real-time NVP monitoring system 150, the metrics collection system 154, and/or the predictive analysis system 158 may or may not include the functionality described herein with reference to FIG. 15. While connections are not shown between the various components illustrated in FIG. 15, it should be understood that some, none, or all of the components illustrated in FIG. 15 can be configured to interact with one other to carry out various device functions. In some embodiments, the components are arranged so as to communicate via one or more busses (not shown). Thus, it should be understood that FIG. 15 and the following description are intended to provide a general understanding of a suitable environment in which various aspects of embodiments can be implemented, and should not be construed as being limiting in any way.

As illustrated in FIG. 15, the mobile device 1500 can include a display 1502 for displaying data. According to various embodiments, the display 1502 can be configured to display the visualization 138, various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 1500 also can include a processor 1504 and a memory or other data storage device ("memory") 1506. The processor 1504 can be configured to process data and/or can execute computer-executable instructions stored in the memory 1506. The computer-executable instructions executed by the processor 1504 can include, for example, an operating system 1508 (e.g., the operating system 114), one or more applications 1510 (e.g., the NVP monitoring application 116, the visualization component 188, and the temporal management component 120), other computer-executable instructions stored in a memory 1506, or the like. In some embodiments, the applications 1510 also can include a UI application (not illustrated in FIG. 15).

The UI application (e.g., the UI 140) can interface with the operating system 1508 to facilitate user interaction with functionality and/or data stored at the mobile device 1500 and/or stored elsewhere. In some embodiments, the operating system 1508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1504 to aid a user, such as the user 136, in viewing and interacting with the visualization 138, entering content, viewing account information, answering/initiating calls, entering/deleting data, entering and setting user IDs and passwords for device access, configuring settings, manipulating address book content and/or settings, multimode interaction, interacting with other applications 1510, and otherwise facilitating user interaction with the operating system 1508, the applications 1510, and/or other types or instances of data 1512 that can be stored at the mobile device 1500.

According to various embodiments, the applications 1510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1510, the data 1512, and/or portions thereof can be stored in the memory 1506 and/or in a firmware 1514, and can be executed by the processor 1504. The firmware 1514 also can store code for execution during device power up and power down operations. It can be appreciated that the firmware 1514 can be stored in a volatile or non-volatile data storage device including, but not limited to, the memory 1506 and/or a portion thereof.

The mobile device 1500 also can include an input/output ("I/O") interface 1516. The I/O interface 1516 can be configured to support the input/output of data such as location information, user information, organization information, presence status information, user IDs, passwords, and application initiation (start-up) requests. In some embodiments, the I/O interface 1516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1500 can be configured to synchronize with another device to transfer content to and/or from the mobile device 1500. In some embodiments, the mobile device 1500 can be configured to receive updates to one or more of the applications 1510 via the I/O interface 1516, though this is not necessarily the case. In some embodiments, the I/O interface 1516 accepts I/O devices such as the input device(s) 148, keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1516 may be used for communications between the mobile device 1500 and a network device or local device.

The mobile device 1500 also can include a communications component 1518. The communications component 1518 can be configured to interface with the processor 1504 to facilitate wired and/or wireless communications with one or more networks described above herein. In some embodiments, other networks include networks that utilize non-cellular wireless technologies such as WI-FI or WIMAX. In some embodiments, the communications component 1518 includes a multimode communications subsystem for facilitating communications via the cellular network and one or more other networks.

The communications component 1518, in some embodiments, includes one or more transceivers. The one or more transceivers, if included, can be configured to communicate over the same and/or different wireless technology standards with respect to one another. For example, in some embodiments one or more of the transceivers of the communications component 1518 may be configured to communicate using GSM, code division multiple access ("CDMA"), CDMAONE, CDMA2000, LTE, and various other 2G, 2.5G, 3G, 4G, 5G, and greater generation technology standards. Moreover, the communications component 1518 may facilitate communications over various channel access methods (which may or may not be used by the aforementioned standards) including, but not limited to, time division multiple access ("TDMA"), frequency division multiple access ("FDMA"), wideband CDMA ("W-CDMA"), orthogonal frequency-division multiplexing ("OFDM"), spatial division multiple access ("SDMA"), and the like.

In addition, the communications component 1518 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 1518 can include a first transceiver ("TxRx") 1520A that can operate in a first communications mode (e.g., GSM). The communications component 1518 also can include an $N^{th}$ transceiver ("TxRx") 1520N that can operate in a second communications mode relative to the first transceiver 1520A (e.g., UMTS). While two transceivers 1520A-N(hereinafter collectively and/or generically referred to as "transceivers 1520") are shown in FIG. 15, it should be appreciated that less than two, two, and/or more than two transceivers 1520 can be included in the communications component 1518.

The communications component 1518 also can include an alternative transceiver ("Alt TxRx") 1522 for supporting other types and/or standards of communications. According to various contemplated embodiments, the alternative transceiver 1522 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 1518 also can facilitate reception from terrestrial radio networks, digital satellite radio networks, internet-based radio service networks, combinations thereof, and the like. The communications component 1518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1500 also can include one or more sensors 1524. The sensors 1524 can include temperature sensors, light sensors, air quality sensors, movement sensors, orientation sensors, noise sensors, proximity sensors, or the like. As such, it should be understood that the sensors 1524 can include, but are not limited to, accelerometers, magnetometers, gyroscopes, infrared sensors, noise sensors, microphones, combinations thereof, or the like. Additionally, audio capabilities for the mobile device 1500 may be provided by an audio I/O component 1526. The audio I/O component 1526 of the mobile device 1500 can include one or more speakers for the output of audio signals, one or more microphones for the collection and/or input of audio signals, and/or other audio input and/or output devices.

The illustrated mobile device 1500 also can include a subscriber identity module ("SIM") system 1528. The SIM system 1528 can include a universal SIM ("USIM"), a universal integrated circuit card ("UICC") and/or other identity devices. The SIM system 1528 can include and/or can be connected to or inserted into an interface such as a slot interface 1530. In some embodiments, the slot interface 1530 can be configured to accept insertion of other identity cards or modules for accessing various types of networks. Additionally, or alternatively, the slot interface 1530 can be configured to accept multiple subscriber identity cards. Because other devices and/or modules for identifying users and/or the mobile device 1500 are contemplated, it should be understood that these embodiments are illustrative, and should not be construed as being limiting in any way.

The mobile device 1500 also can include an image capture and processing system 1532 ("image system"). The image system 1532 can be configured to capture or otherwise obtain photos, videos, and/or other visual information. As such, the image system 1532 can include cameras, lenses, charge-coupled devices ("CCDs"), combinations thereof, or the like. The mobile device 1500 may also include a video system 1534. The video system 1534 can be configured to capture, process, record, modify, and/or store video content. Photos and videos obtained using the image system 1532 and the video system 1534, respectively, may be added as message content to a multimedia message service ("MIMS") message, email message, and sent to another mobile device. The video and/or photo content also can be shared with other devices via various types of data transfers via wired and/or wireless communication devices as described herein.

The mobile device 1500 also can include one or more location components 1536 (e.g., the location component(s) 158). The location components 1536 can be configured to send and/or receive signals to determine a geographic location of the mobile device 1500. According to various embodiments, the location components 1536 can send and/or receive signals from GPS devices, A-GPS devices, WI-FI/WIMAX and/or cellular network triangulation data, combinations thereof, and the like. The location component 1536 also can be configured to communicate with the communications component 1518 to retrieve triangulation data for determining a location of the mobile device 1500. In some embodiments, the location component 1536 can interface with cellular network nodes, telephone lines, satellites, location transmitters and/or beacons, wireless network transmitters and receivers, combinations thereof, and the like. In some embodiments, the location component 1536 can include and/or can communicate with one or more of the sensors 1524 such as a compass, an accelerometer, and/or a gyroscope to determine the orientation of the mobile device 1500. Using the location component 1536, the mobile device 1500 can generate and/or receive data to identify its geographic location, or to transmit data used by other devices to determine the location of the mobile device 1500. The location component 1536 may include multiple components for determining the location and/or orientation of the mobile device 1500.

The illustrated mobile device 1500 also can include a power source 1538. The power source 1538 can include one or more batteries, power supplies, power cells, and/or other power subsystems including alternating current ("AC") and/or direct current ("DC") power devices. The power source 1538 also can interface with an external power system or charging equipment via a power I/O component 1540. Because the mobile device 1500 can include additional and/or alternative components, the above embodiment should be understood as being illustrative of one possible operating environment for various embodiments of the concepts and technologies described herein. The described embodiment of the mobile device 1500 is illustrative, and should not be construed as being limiting in any way.

Figure 16:
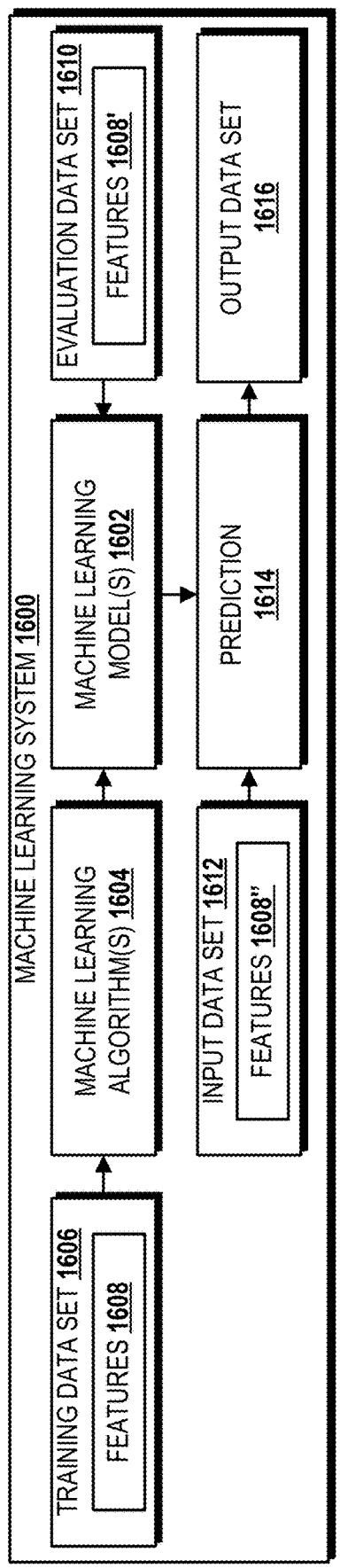
FIG. 16 is a block diagram illustrating an illustrative machine learning system capable of implementing aspects of the concepts and technologies disclosed herein.

Turning now to FIG. 16, a machine learning system 1600 capable of implementing aspects of the embodiments disclosed herein will be described. In some embodiments, the computer system 102, the XR system 144, the real-time NVP monitoring system 150, the metrics collection system 154, and/or the predictive analysis system 158 can be configured to include or to utilize the machine learning system 1600.

The illustrated machine learning system 1600 includes one or more machine learning models 1602. The machine learning models 1602 can include supervised and/or semi-supervised learning models. The machine learning model(s) 1602 can be created by the machine learning system 1600 based upon one or more machine learning algorithms 1604. The machine learning algorithm(s) 1604 can be any existing, well-known algorithm, any proprietary algorithms, or any future machine learning algorithm. Some example machine learning algorithms 1604 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. The machine learning algorithm(s) 1604 can include one or more predictive analysis algorithms, some examples of which include, but are not limited to, a random number generator, an average of past values, a moving average, an exponential moving average, a Monte Carlo simulation technique, linear functions, and non-linear functions that may be used to predict the future state data 160. Those skilled in the art will appreciate the applicability of various machine learning algorithms 1604 based upon the problem(s) to be solved by machine learning via the machine learning system 1600.

The machine learning system 1600 can control the creation of the machine learning models 1602 via one or more training parameters. In some embodiments, the training parameters are selected modelers at the direction of an enterprise, for example. Alternatively, in some embodiments, the training parameters are automatically selected based upon data provided in one or more training data sets 1606. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 1604 converges to the optimal weights. The machine learning algorithm 1604 can update the weights for every data example included in the training data set 1606. The size of an update is controlled by the learning rate. A learning rate that is too high might prevent the machine learning algorithm 1604 from converging to the optimal weights. A learning rate that is too low might result in the machine learning algorithm 1604 requiring multiple training passes to converge to the optimal weights.

The model size is regulated by the number of input features ("features") 1606 in the training data set 1606. A greater the number of features 1608 yields a greater number of possible patterns that can be determined from the training data set 1606. The model size should be selected to balance the resources (e.g., compute, memory, storage, etc.) needed for training and the predictive power of the resultant machine learning model 1602.

The number of training passes indicates the number of training passes that the machine learning algorithm 1604 makes over the training data set 1606 during the training process. The number of training passes can be adjusted based, for example, on the size of the training data set 1606, with larger training data sets being exposed to fewer training passes in consideration of time and/or resource utilization. The effectiveness of the resultant machine learning model 1602 can be increased by multiple training passes.

Data shuffling is a training parameter designed to prevent the machine learning algorithm 1604 from reaching false optimal weights due to the order in which data contained in the training data set 1606 is processed. For example, data provided in rows and columns might be analyzed first row, second row, third row, etc., and thus an optimal weight might be obtained well before a full range of data has been considered. By data shuffling, the data contained in the training data set 1606 can be analyzed more thoroughly and mitigate bias in the resultant machine learning model 1602.

Regularization is a training parameter that helps to prevent the machine learning model 1602 from memorizing training data from the training data set 1606. In other words, the machine learning model 1602 fits the training data set 1606, but the predictive performance of the machine learning model 1602 is not acceptable. Regularization helps the machine learning system 1600 avoid this overfitting/memorization problem by adjusting extreme weight values of the features 1608. For example, a feature that has a small weight value relative to the weight values of the other features in the training data set 1606 can be adjusted to zero.

The machine learning system 1600 can determine model accuracy after training by using one or more evaluation data sets 1610 containing the same features 1608' as the features 1608 in the training data set 1606. This also prevents the machine learning model 1602 from simply memorizing the data contained in the training data set 1606. The number of evaluation passes made by the machine learning system 1600 can be regulated by a target model accuracy that, when reached, ends the evaluation process and the machine learning model 1602 is considered ready for deployment.

After deployment, the machine learning model 1602 can perform a prediction operation ("prediction") 1614 with an input data set 1612 having the same features 1608" as the features 1608 in the training data set 1606 and the features 1608' of the evaluation data set 1610. The results of the prediction 1614 are included in an output data set 1616 consisting of predicted data. The machine learning model 1602 can perform other operations, such as regression, classification, and others. As such, the example illustrated in FIG. 16 should not be construed as being limiting in any way.

Figure 17:
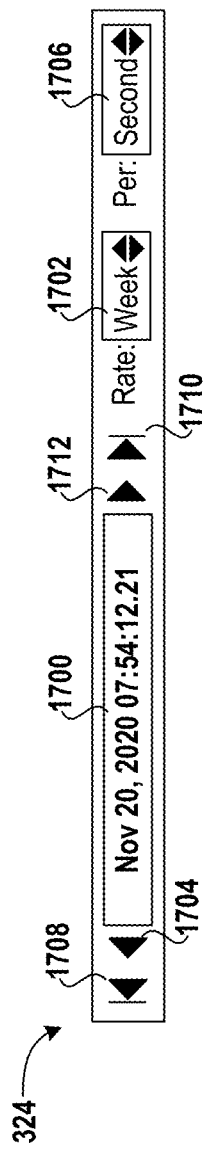
FIG. 17 is a diagram illustrating a temporal management control that allows a user to control the playback of a data visualization, according to an illustrative embodiment.

Turning now to FIG. 17, a diagram illustrating the temporal management control 324 that allows the user 136 to control the playback of the visualization 138 will be described, according to an illustrative embodiment. The illustrated temporal management control 324 shows, in a current date/time control 1700, the current date associated with the data (e.g., the NVP data 106) being visualized. The current date/time control 1700 may be selected to reveal a calendar/entry control to allow the user 136 to directly select the date/time of the data to be visualized. The current granularity of playback data "buckets" can be selected from a playback time period selector 1702. When the user 136 selects the playback time period selector 1702, a drop-down menu or other UI element can allow the user 136 to select the day, week, month, or year as the unit of time to be used during playback. A single step reverse control 1704 can be used to "rewind" to show the data from the previous time period. Selecting a playback time unit selector 1706 allows the user 136 to select desired time units such as 0.05 second (20 frames per second), 0.1 second (10 frames per second), 1 second, 5 seconds, and so on, where larger values represent a slower playback speed. A reverse continuous playback/pause control 1708 is used to toggle playback in reverse, whereas a forward continuous playback/pause control 1710 is used to advance the visualization 138 to the next time period at a rate selected by the playback time unit selector 1706, where each "frame" of the visualization 138 represents an advancement in time approximately equal to the playback time period selector 1702. The value presented for a metric is determined by an algorithm that uses the values of the metric over that time period. For example, if data is captured daily but the time period is "Weekly," the algorithm will have to determine how to compute the seven samples into a value to be displayed to the user 136. Example algorithms include, but are not limited to, average, weighted average, first in, or last out. A single step forward control 1712 is used to advance the visualization 138 time period by one unit of time indicated in the playback time period selector 1702.

Based on the foregoing, it should be appreciated that concepts and technologies directed to time-based visualizations for NVPs have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   obtaining, by a computer system comprising a processor, from a real-time network virtualization platform monitoring system operating in communication with a network virtualization platform, present state data associated with a present state of the network virtualization platform, wherein the present state data is collected in real-time by the real-time network virtualization platform monitoring system, and wherein the present state data is associated with the present state of a service provided, at least in part, by an application operating within a software-defined network created and managed, at least in part, by the network virtualization platform;

obtaining, by the computer system, from a metrics collection system operating in communication with the network virtualization platform, past state data associated with a past state of the network virtualization platform, wherein the past state data is collected based upon historical data about the network virtualization platform, and wherein the past state data is associated with the past state of the service provided, at least in part, by the application operating within the software-defined network created and managed, at least in part, by the network virtualization platform;

obtaining, by the computer system, from a predictive analysis system operating in communication with the network virtualization platform, future state data that is associated with a predicted future state of the network virtualization platform, wherein the future state data is generated by the predictive analysis system based upon a prediction about the network virtualization platform, and wherein the future state data is associated with the predicted future state of the service provided, at least in part, by the application operating within the software-defined network created and managed, at least in part, by the network virtualization platform;

generating, by the computer system, a visualization of the present state data, the past state data, and the future state data associated with the network virtualization platform, wherein the visualization comprises a three-dimensional visualization, the three-dimensional visualization comprises a central cube visualization, the central cube visualization comprises a plurality of smaller cube virtualizations, the plurality of smaller cube virtualizations comprises a plurality of nodes representative of a plurality of applications, and each of the plurality of applications is executable by at least a portion of a plurality of resources of the network virtualization platform;

presenting, by the computer system, a temporal management function comprising a plurality of selections representative of the present state, the past state, and the predicted future state of the network virtualization platform;

receiving, by the computer system via the temporal management function, a selection, from the plurality of selections, of the present state, the past state, or the predicted future state;

manipulating, by the computer system, the visualization in accordance with the selection; and outputting, by the computer system, the visualization.

2. The method of claim 1, wherein the central cube visualization further comprises a plurality of networking links between at least a portion of the plurality of applications of the plurality of smaller cube virtualizations.

3. The method of claim 2, wherein the present state data, the past state data, and the future state data each further comprise a topology of the plurality of resources of the network virtualization platform.

4. The method of claim 1, wherein presenting the temporal management function comprises presenting a timeline; and wherein each of the plurality of selections comprises a time interval.

5. The method of claim 1, wherein manipulating the visualization in accordance with the selection comprises transitioning, at least in part, between the present state, the past state, and the future state.

6. A computer-readable storage medium having instructions stored thereon that, when executed by a computer system, cause the computer system to perform operations comprising:

obtaining, from a real-time network virtualization platform monitoring system operating in communication with a network virtualization platform, present state data associated with a present state of the network virtualization platform, wherein the present state data is collected by the real-time network virtualization platform monitoring system in real-time, and wherein the present state data is associated with the present state of a service provided, at least in part, by an application operating within a software-defined network created and managed, at least in part, by the network virtualization platform;

obtaining, from a metrics collection system operating in communication with the network virtualization platform, past state data associated with a past state of the network virtualization platform, wherein the past state data is collected based upon historical data about the network virtualization platform, and wherein the past state data is associated with the past state of the service provided, at least in part, by the application operating within the software-defined network created and managed, at least in part, by the network virtualization platform;

obtaining, from a predictive analysis system operating in communication with the network virtualization platform, future state data associated with a predicted future state of the network virtualization platform, wherein the future state data is generated by the predictive analysis system based upon a prediction about the network virtualization platform, and wherein the future state data is associated with the predicted future state of the service provided, at least in part, by the application operating within the software-defined network created and managed, at least in part, by the network virtualization platform;

generating a visualization of the present state data, the past state data, and the future state data associated with the network virtualization platform, wherein the visualization comprises a three-dimensional visualization, the three-dimensional visualization comprises a central cube visualization, the central cube visualization comprises a plurality of smaller cube virtualizations, the plurality of smaller cube virtualizations comprises a plurality of nodes representative of a plurality of applications; and each of the plurality of applications is executable by at least a portion of a plurality of resources of the network virtualization platform;

presenting a temporal management function comprising a plurality of selections representative of the present state, the past state, and the predicted future state of the network virtualization platform;

receiving, via the temporal management function, a selection, from the plurality of selections, of the present state, the past state, or the predicted future state;

manipulating the visualization in accordance with the selection; and outputting the visualization.

7. The computer-readable storage medium of claim 6, wherein the present state data, the past state data, and the future state data each further comprise a topology of a plurality of resources of the network virtualization platform.

8. The computer-readable storage medium of claim 6, wherein the central cube visualization further comprises a plurality of networking links between at least a portion of the plurality of applications of the plurality of smaller cube virtualizations.

9. The computer-readable storage medium of claim 6, wherein presenting the temporal management function comprises presenting a timeline; and wherein each of the plurality of selections comprises a time interval.

10. The computer-readable storage medium of claim 6, wherein manipulating the visualization in accordance with the selection comprises transitioning, at least in part, between the present state, the past state, and the future state.

11. A computer system comprising:

a processor; and a memory comprising instructions that, when executed by the processor, cause the processor to perform operations comprising obtaining, from a real-time network virtualization platform monitoring system operating in communication with a network virtualization platform, present state data associated with a present state of the network virtualization platform, wherein the present state data is collected by the real-time network virtualization platform monitoring system in real-time, and wherein the present state data is associated with the present state of a service provided, at least in part, by an application operating within a software-defined network created and managed, at least in part, by the network virtualization platform, obtaining, from a metrics collection system operating in communication with the network virtualization platform, past state data associated with a past state of the network virtualization platform, wherein the past state data is collected based upon historical data about the network virtualization platform, and wherein the past state data is associated with the past state of the service provided, at least in part, by the application operating within the software-defined network created and managed, at least in part, by the network virtualization platform, obtaining, from a predictive analysis system operating in communication with the network virtualization platform, future state data associated with a predicted future state of the network virtualization platform, wherein the future state data is generated by the predictive analysis system based upon a prediction about the network virtualization platform, and wherein the future state data is associated with the predicted future state of the service provided, at least in part, by the application operating within the software-defined network created and managed, at least in part, by the network virtualization platform, generating a visualization of the present state data, the past state data, and the future state data associated with the network virtualization platform, wherein the visualization comprises a three-dimensional visualization, the three-dimensional visualization comprises a central cube visualization, the central cube visualization comprises a plurality of smaller cube virtualizations, the plurality of smaller cube virtualizations comprises a plurality of nodes representative of a plurality of applications, and each of the plurality of applications is executable by at least a portion of a plurality of resources of the network virtualization platform, presenting a temporal management function comprising a plurality of selections representative of the present state, the past state, and the predicted future state of the network virtualization platform, receiving, via the temporal management function, a selection, from the plurality of selections, of the present state, the past state, or the predicted future state, manipulating the visualization in accordance with the selection, and outputting the visualization.

12. The computer system of claim 11, wherein the central cube visualization further comprises a plurality of networking links between at least a portion of the plurality of applications of the plurality of smaller cube virtualizations.

13. The computer system of claim 12, wherein the present state data, the past state data, and the future state data each further comprise a topology of the plurality of resources of the network virtualization platform.

14. The computer system of claim 11, wherein presenting the temporal management function comprises presenting a timeline; and wherein each of the plurality of selections comprises a time interval.

15. The computer system of claim 11, wherein manipulating the visualization in accordance with the selection comprises transitioning, at least in part, between the present state, the past state, and the future state.

* * * * *